United States Patent
Wato

(10) Patent No.: US 9,635,229 B2
(45) Date of Patent: Apr. 25, 2017

(54) OPTICAL DEVICE AND IMAGING DEVICE WITH MECHANISM FOR REDUCING CONDENSATION

(71) Applicant: DENSO CORPORATION, Kariya, Aichi-pref. (JP)

(72) Inventor: Koji Wato, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/641,726

(22) Filed: Mar. 9, 2015

(65) Prior Publication Data
US 2015/0256729 A1    Sep. 10, 2015

(30) Foreign Application Priority Data

Mar. 10, 2014  (JP) ................................ 2014-046453
Dec. 24, 2014  (JP) ................................ 2014-260494

(51) Int. Cl.
| | | |
|---|---|---|
| *H04N 5/225* | (2006.01) | |
| *G03B 17/08* | (2006.01) | |
| *B60R 11/04* | (2006.01) | |
| *G03B 17/02* | (2006.01) | |
| *G03B 11/04* | (2006.01) | |
| *B60R 11/00* | (2006.01) | |

(52) U.S. Cl.
CPC ........... *H04N 5/2254* (2013.01); *B60R 11/04* (2013.01); *G03B 17/02* (2013.01); *H04N 5/2251* (2013.01); *H04N 5/2252* (2013.01); *B60R 2011/0026* (2013.01); *G03B 11/045* (2013.01)

(58) Field of Classification Search
CPC .................................................... H04N 5/2251
USPC .............................................. 348/311, 207.99
See application file for complete search history.

(56) References Cited

U.S. PATENT DOCUMENTS

| | | |
|---|---|---|
| 6,061,087 A | 5/2000 | Schieltz et al. |
| 2005/0276599 A1 | 12/2005 | Kajino et al. |
| 2012/0155855 A1 | 6/2012 | Okuda |
| 2012/0207461 A1 | 8/2012 | Okuda |
| 2014/0016919 A1 | 1/2014 | Okuda |

FOREIGN PATENT DOCUMENTS

| | | |
|---|---|---|
| JP | H03-262277 | 11/1991 |
| JP | H04-11522 | 1/1992 |
| JP | H04-348648 | 12/1992 |
| JP | H06-030315 | 2/1994 |
| JP | H06-217320 | 8/1994 |
| JP | H06-258713 | 9/1994 |
| JP | H08-205007 | 8/1996 |
| JP | H11-078737 | 3/1999 |
| JP | H11-119315 | 4/1999 |

(Continued)

*Primary Examiner* — Joel Fosselman
(74) *Attorney, Agent, or Firm* — Harness, Dickey & Pierce, P.L.C.

(57) ABSTRACT

In an optical device, a lens assembly includes a lens for receiving light and a holder for holding the lens. A circuit board performs at least one process based on the received light. A housing has an opening and is configured to house the lens assembly and the circuit board therein such that at least part of the circuit board faces the lens assembly, and the lens assembly is exposed via the opening. A mechanism for defining a passage located around the lens assembly to communicate with the opening. The passage guides air, entering an inside of the housing via the opening, so as not to be directed toward the circuit board.

11 Claims, 11 Drawing Sheets

(56) References Cited

FOREIGN PATENT DOCUMENTS

| | | |
|---|---|---|
| JP | 2001-268420 | 9/2001 |
| JP | 2002-040554 | 2/2002 |
| JP | 2002-221748 | 8/2002 |
| JP | 2003-255456 | 9/2003 |
| JP | 2003-527758 | 9/2003 |
| JP | 2003-300414 | 10/2003 |
| JP | 2004-025930 | 1/2004 |
| JP | 2005-354471 | 12/2005 |
| JP | 2008-239017 | 10/2008 |
| JP | 2012-133100 | 7/2012 |
| JP | 2012-166615 | 9/2012 |
| JP | 2013-193558 | 9/2013 |

OPTICAL DEVICE AND IMAGING DEVICE WITH MECHANISM FOR REDUCING CONDENSATION

CROSS REFERENCE TO RELATED APPLICATION

This application is based on and claims the benefit of priority from Japanese Patent Applications No. 2014-46453 and 2014-260494 respectively filed on Mar. 10, 2014 and Dec. 24, 2014, the disclosure of each of which is incorporated in its entirety herein by reference.

TECHNICAL FIELD

The present disclosure relates to optical devices and imaging devices each equipped with a lens assembly, a circuit board, and a housing that houses the lens assembly and circuit board.

BACKGROUND

There are imaging devices, which are an example of optical devices, equipped with a lens assembly comprised of a lens and a holder for holding the lens, a circuit board, and a housing that houses the lens assembly and circuit board. In such an imaging device, the occurrence of condensation on the circuit board may cause water droplets to produce water migration in the circuit board, resulting in insulation failures in the circuit board.

There are some methods for reducing the risk of the occurrence of condensation on the circuit board. A first method is to coat a drip-proof material on the circuit board, and a second method is to encapsulate a drying agent or inert gas in the housing. A third method is to design the housing having a closable passage communicating between the inside and outside of the housing, and fit a moisture permeable material impervious to water in the closable passage. The second and third methods are disclosed respectively in Japanese Patent Application Publications No. 2002-221748 and 2008-239017.

SUMMARY

However, the first method may increase the manufacturing cost of the imaging device for the drop-proof material, and require coating work using the drop-proof material. The second method may result in heat generated from the circuit board being excessively trapped in the encapsulated housing. The third method may increase the manufacturing cost of the imaging device for the specific design of the housing and for the moisture permeable material.

In view the circumstances set forth above, one aspect of the present disclosure seeks to provide optical devices and imaging devices, each of which includes a lens assembly, a circuit board, and a housing that houses the lens assembly and circuit board, each of which is capable of addressing the problems set forth above.

Specifically, an alternative aspect of the present disclosure aims to provide such optical devices and imaging devices, each of which has a simpler structure for reducing the risk of condensation occurring on the circuit board, without sealing the housing.

According to a first exemplary aspect of the present disclosure, there is provided an optical device. The optical device includes a lens assembly including at least one lens for receiving light and a holder for holding the at least one lens. The optical device includes a circuit board for performing at least one process based on the received light. The optical device includes a housing having an opening and configured to house the lens assembly and the circuit board therein such that at least part of the circuit board faces the lens assembly, and the lens assembly is exposed via the opening. The optical device includes a mechanism defining a passage located around the lens assembly to communicate with the opening. The passage guides air, entering an inside of the housing via the opening, so as not to be directed toward the circuit board.

According to a second exemplary aspect of the present disclosure, there is provided an optical system for a vehicle. The optical system includes the optical device as recited in the first exemplary aspect. The housing has a concave recess communicating with the opening thereof. The optical device is housed in the housing with the lens assembly being exposed via a set of the concave recess and the opening such that a field of view of the lens assembly is ensured via the set of the concave recess and the opening. The optical system includes a cover having an opening wall and covering the optical device, and a bracket attached to an inner surface of a windshield of the vehicle and to the cover. The bracket covers the opening wall of the cover such that the field of view of the lens assembly is ensured via the set of the concave recess and the opening. The optical system includes a hood at least partly fitted in the concave recess with the field of view of the lens assembly being unobscured.

According to a third exemplary aspect of the present disclosure, there is provided an imaging device to be installed in a vehicle. The imaging device includes a lens assembly including at least one lens for receiving light and a holder for holding the at least one lens, an imaging sensor for successively picking up images based on the received light, and a circuit board. The imaging device includes an image processing circuit implemented in the circuit board and configured to capture the successively picked-up images, and perform image processing of each of the picked-up images. The image processing circuit includes 3.3 V signal lines, and external terminals with 1.27 mm or lower pitches. The image processing circuit is configured to receive, via a serial interactive communication bus installed in the vehicle, a signal output from at least one sensor installed in the vehicle. The signal is indicative of a travelling condition of the vehicle. The image processing circuit is configured to output, based on at least one of a result of the image processing of the image processing circuit and the signal output from the at least one sensor, a control signal to the vehicle via the serial interactive communication bus. The control signal controls at least one actuator installed in the vehicle. The imaging device includes a housing having an opening and configured to house the lens assembly, the circuit board, and the imaging sensor therein such that at least part of the circuit board faces the lens assembly, and the lens assembly is exposed via the opening. The imaging device includes a mechanism defining a passage located around the lens assembly to communicate with the opening, the passage guiding air, entering an inside of the housing via the opening, so as not to be directed toward the circuit board.

According to a fourth exemplary aspect of the present disclosure, there is provided an optical system. The optical system includes a lens assembly including at least one lens for receiving light and a holder for holding the at least one lens, and a circuit board for performing at least one process based on the received light. The optical system includes a housing having an opening and configured to house the lens assembly and the circuit board therein such that at least part of the circuit board faces the lens assembly, and the lens assembly is exposed via the opening. The optical system includes a mechanism defining a passage located around the lens assembly to communicate with the opening. The passage guides air, entering an inside of the housing via the opening, so as not to be directed toward the circuit board. The optical system includes a bracket attached to a windshield of a vehicle and configured to fix the lens assembly to the windshield. The optical system includes a hood attached to the bracket and surrounding a field of view of the lens assembly for reducing a possibility that an object located outside of the field of view of the lens assembly is captured by the field of view of the lens assembly.

Each of the optical device, optical system, imaging device, and the optical system according to the respective first, second, third, and fourth exemplary aspects includes the mechanism. The mechanism defines the passage located around the lens assembly to communicate with the opening. The passage guides air, entering the inside of the housing via the opening, so as not to be directed toward the circuit board.

This mechanism therefore reduces the possibility that the air entering the inside of the housing hits the circuit board because the air is directed to be departed from the circuit board. Particularly, even if the air, which has been directed to be departed from the circuit board, finally hits the circuit board, the air has travelled a long distance until hitting the circuit board. This is because the air was directed to be departed from the circuit board once. This results in the air, which has travelled such a long distance, being sufficiently cooled when reaching the circuit board. This reduces the risk of the occurrence of condensation on the circuit board without sealing the housing.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

An embodiment of the present disclosure will be described hereinafter with reference to the accompanying drawings.

Figure 4:
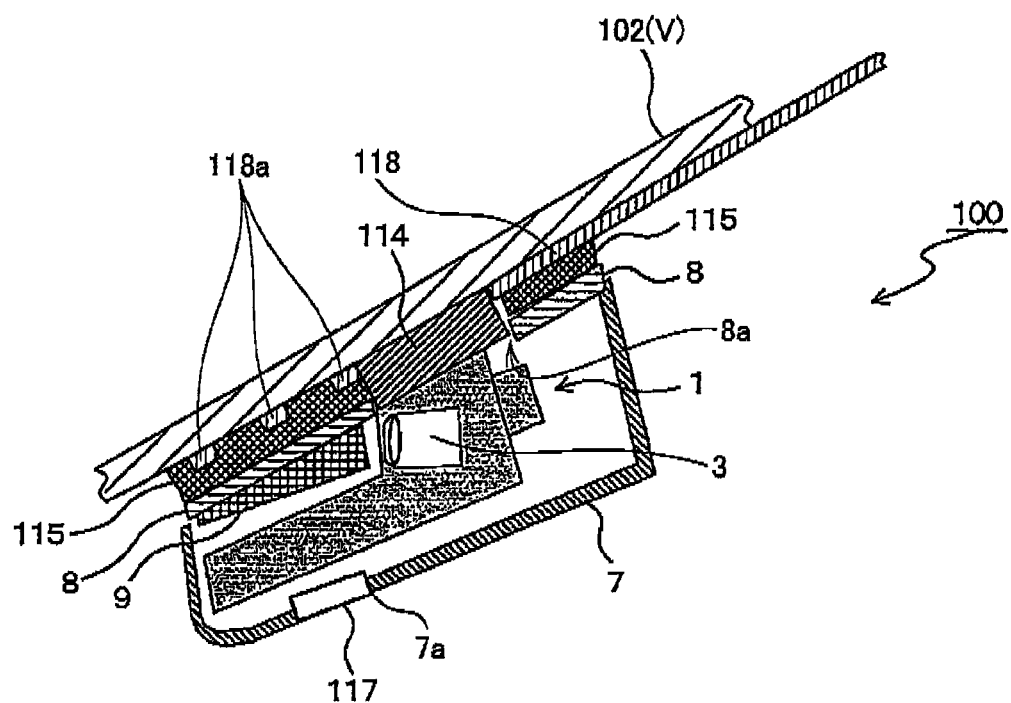
FIG. 4 is a cross sectional view schematically illustrating a camera system including the imaging device and attached to a front windshield of a vehicle.

An imaging device 1, which is an example of optical devices, according to the embodiment is installed in, for example, a vehicle V, a part, such as a front windshield, of which is illustrated in FIG. 4. The imaging device 1 picks up images of a region ahead of the vehicle V. The imaging device 1 also performs analyses on the picked-up images, and sends the results of analyses to one or more ECUs, such as headlight control ECU and a lane departure detection ECU, installed in the vehicle V.

In the specification, the front, rear, right, and left directions described show the front, rear, right, and left directions of the vehicle V when the vehicle V is travelling in the front direction of the vehicle V. The front-rear direction corresponds to the longitudinal direction of the vehicle V, and the right-left direction corresponds to the lateral direction, i.e. the width direction, of the vehicle V.

Figure 1:
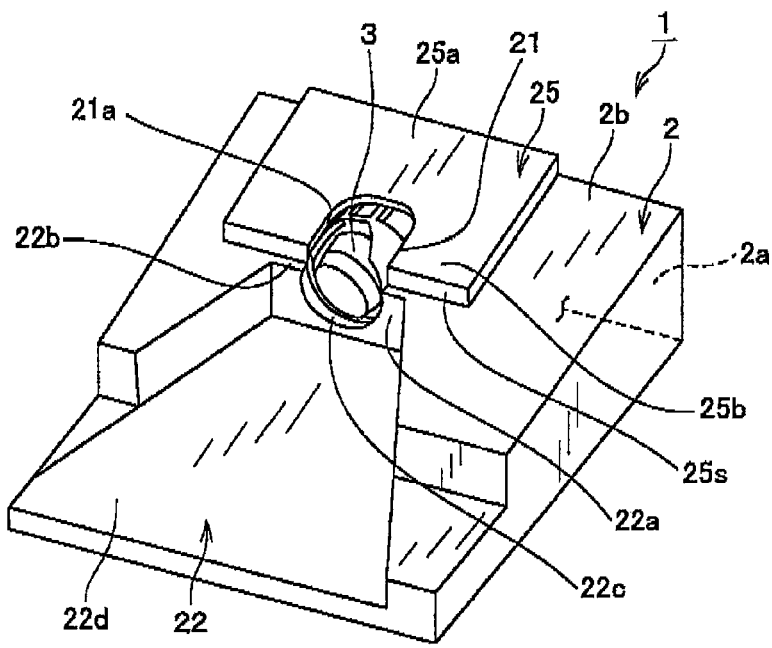
FIG. 1 is a perspective view schematically illustrating an example of the appearance of an imaging device according to an embodiment of the present disclosure.
Figure 2:
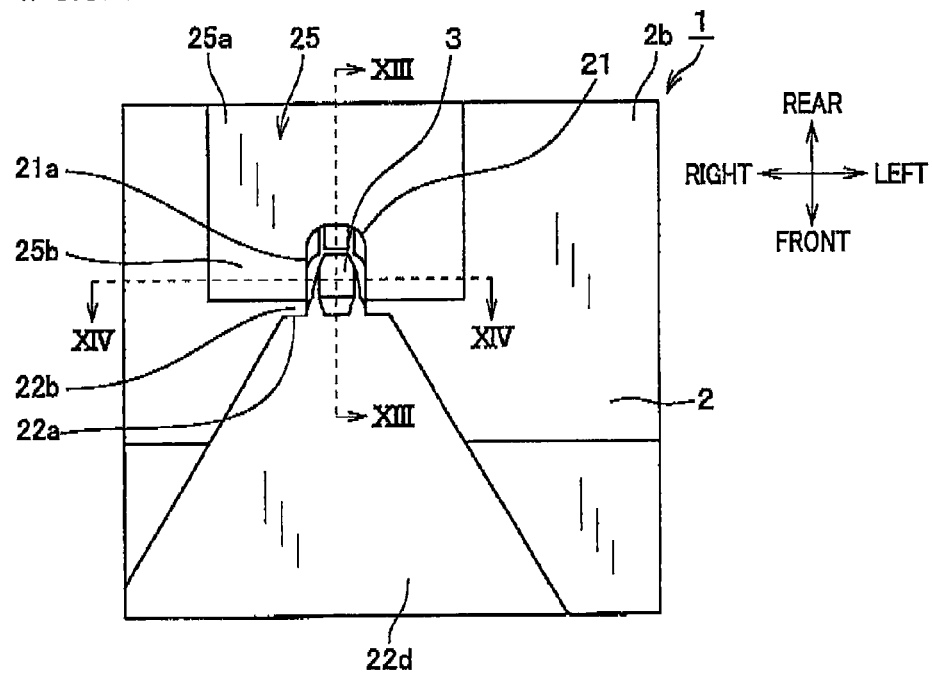
FIG. 2 is a plan view of the imaging device illustrated in FIG. 1.

Referring to FIGS. 1 and 2, the imaging device 1 is comprised of a housing 2 and a camera module 3 installed in the housing 2. The housing 2 is made of, for example, a metal, and has a substantially rectangular parallelepiped shape with an inner hollow container space. The housing 2 has a rear wall 2a directed to the rear side of the vehicle V when the imaging device 2 is installed in the vehicle V.

The housing 2 has a top wall 2b inclined toward the front side of the vehicle V. A rectangular part of a rear half portion of the top wall 2b is protruded upward to form a protruded wall 25; the protruded wall 25 is located to be slightly shifted rightward relative to the middle of the rear half portion in the lateral direction of the housing 2.

The protruded wall 25 serves as an attachment wall to, for example, the front windshield 102 of the vehicle V described later (see FIG. 4). Hereinafter, the protruded wall 25 will be referred to as an attachment wall 25.

The attachment wall 25 has a substantially U-shaped concave recess 21a formed in a front surface 25S thereof to a substantially center of the attachment wall 25, so that a top surface of the attachment wall 25 has a substantially concave shape. In other words, the attachment wall 25 is comprised of a left-hand end 26 and a right-hand end 27 that sandwiches the U-shaped concave recess 21a.

The housing 2 has a trapezoidal concave recess 22 formed in the top surface 2b downward. The trapezoidal concave recess 22 has a vertical wall 22a located close to the front surface 25s of the attachment wall 25. The vertical wall 22a has a top surface 22b intersecting with the front surface 25s of the attachment wall 25, so that the vertical wall 22a and the attachment wall 25 constitute a downward stepped portion. The vertical wall 22a has a concave recess 22c formed in the top surface 22b and communicating with the U-shaped concave recess 21a. The U-shaped concave recess 21a and the concave recess 22c constitute an opening 21 for communicating between the exterior and interior of the housing 2.

The trapezoidal concave recess 22 has a bottom surface 22d having a substantially trapezoidal shape. The trapezoidal bottom surface 22d extends, from the vertical wall 22a, in the front direction such that the extending lower base of the trapezoidal bottom surface 22d is longer than the upper base thereof.

The opening 21 consisting of the U-shaped concave recess 21a and the concave recess 22c, and the trapezoidal concave recess 22 serve as an exposing structure (21, 22) that causes a part of a lens assembly 3A of the camera module 3 installed in the housing 2 to be exposed from the housing 2, i.e. uncovered. This permits the lens assembly 3A to receive light from the front of the vehicle V, and the camera module 3 to pick up images ahead of the vehicle V based on the received light. In other words, the exposing structure (21, 22) permits the housing 2 not to interfere with the field of view of the lens assembly 3A, i.e. the camera module 3.

Figure 3:
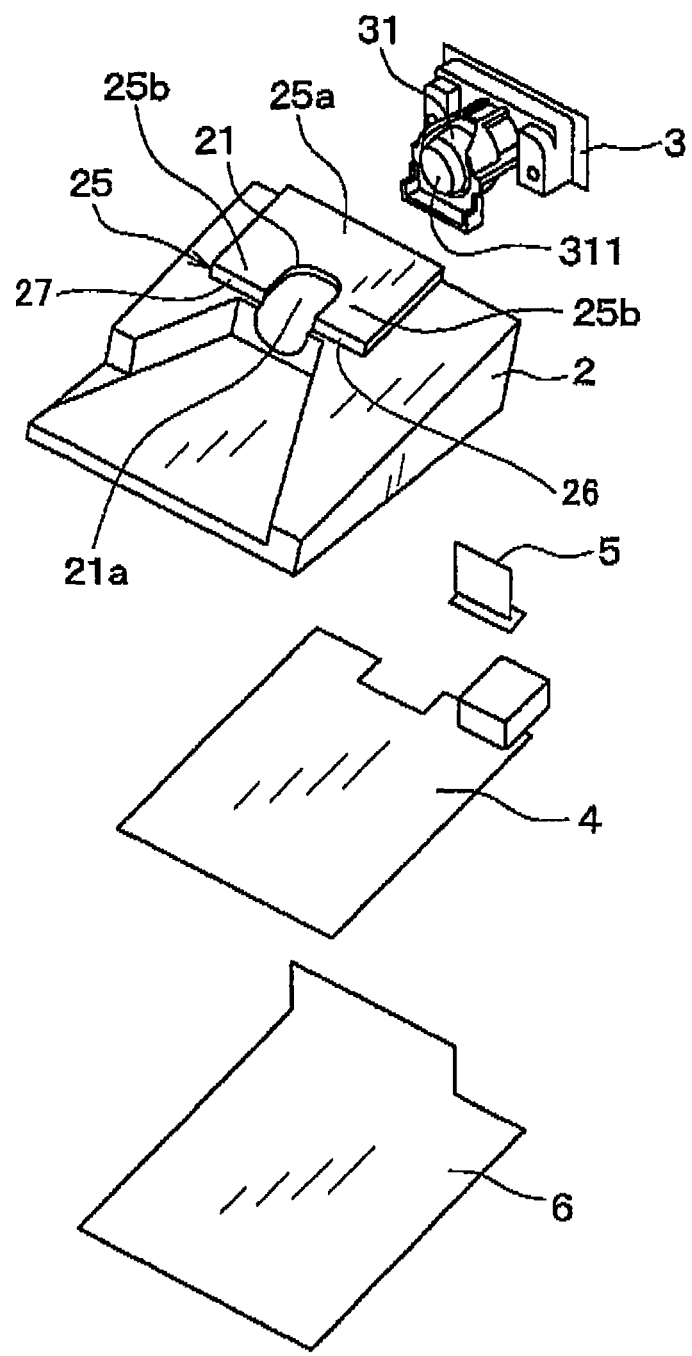
FIG. 3 is an exploded perspective view of the imaging device illustrated in FIG. 1.

Referring to FIG. 3, the imaging device 1 is also comprised of a control circuit board 4, an electrical connection harness 5, and a bottom cover 6. The camera module 3 is disposed above the control circuit board 4 and the electrical connection harness 5 such that the opening 21 faces the control circuit board 4. The electrical connection harness 5 electrically connects electrical parts of the camera module 3 and the control circuit board 4. The bottom cover 6 is disposed at a lower side of the control circuit board 4 so as to be integral with a bottom wall of the housing 2.

The imaging device 1 constitutes a camera system 100 serving as an example of imaging apparatuses attached to the vehicle V. The camera system 100 is for example attached to the top center of the inner surface of the front windshield 102 of the vehicle V. In other words, the camera system 100 is located to be close to a rearview mirror of the vehicle V.

Figure 5:
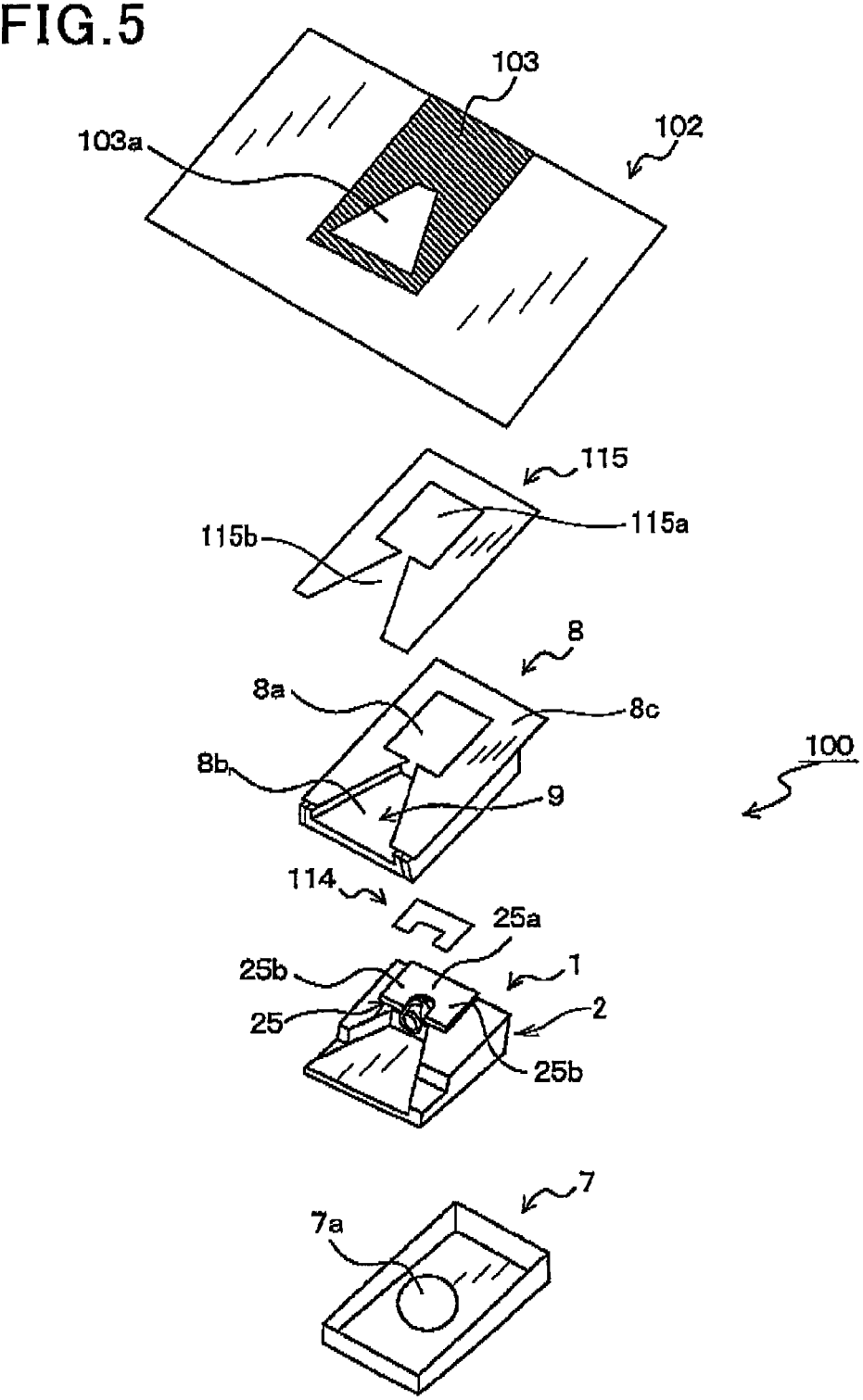
FIG. 5 is an exploded perspective view schematically illustrating the camera system illustrated in FIG. 4.

The camera system 100 includes a plate-like bracket 8, a hood 9, a first thermal-conductive member 114, a second thermal-conductive member 115, a design cover 7, a ventilation fan 117, and a hot wire 118 in addition to the imaging device 1. FIGS. 4 and 5 schematically illustrate a part of the front windshield 102. In FIG. 5, the ventilation fan 117 and hot wire 118 are eliminated in illustration for simpler description of the camera system 100.

Referring to FIGS. 4 and 5, the design cover 7 has a rectangular-parallelepiped shape with an inner hollow container therein and an opening top wall. The imaging device 1 is contained in the inner hollow container of the design cover 7 such that the bracket 8 covers the top of the imaging device 1 while the hood 9 covers the trapezoidal concave recess 22.

The bracket 8 is attached via the second thermal-conductive member 115 to the top center of the inner surface of the front windshield 102 located close to the rearview mirror, more specifically located behind the rearview mirror.

Specifically, the bracket 8 has an opening 8a facing at least part of the top surface of the attachment wall 25 of the housing 2. The bracket 8 also has a substantially V-shaped recess, in other words, notch, 8b communicating with the opening 8a and facing the trapezoidal concave recess 22 of the housing 2; the opening 8a and the V-shaped recess 8b result in the bracket 8 having a substantially U shape. The bracket 8 serves to fix the housing 2 of the imaging device 1 to the inner surface of the front windshield 102. Specifically, the bracket 8 has a first major surface, i.e. a top surface, 8c fixedly mounted, for example, adhered, on the inner surface of the front windshield 102 via the second thermal-conductive member 115. The housing 2 is attached to the bracket 8 fixedly mounted on the inner surface of the front windshield 102 such that the attachment wall 25 of the housing 2 faces the front windshield 102 via the first thermally-conductive member 114.

When the housing 2 is attached to the bracket 8, the V-shaped recess 8b is located in front of the camera module 3. The V-shaped recess 8b has a substantially trapezoidal shape so as to become broader in width toward the front side of the camera module 3; the recess 8b corresponds in shape to a horizontally sector imaging region, i.e. a horizontal view-angle region, of the lens assembly 3A of the camera module 3 extending in front of the lens assembly 3A. This permits the field of view of the lens assembly 3A, i.e. the camera module 3, to be sufficiently ensured.

The hood 9 is made of a resin, and has a substantially trapezoidal bottom surface, and a pair of opposing side surfaces perpendicular to respective oblique sides of the trapezoidal bottom surface. The hood 9 is attached to a lower side of the bracket 8 with the trapezoidal bottom surface facing the recess 8b. Specifically, when the housing 2 is attached to the bracket 8, the hood 9 is mounted on or above the trapezoidal bottom surface 22d of the trapezoidal concave recess 22 such that the bottom surface and the opposing side surfaces of the hood 9 surround the substantially sector imaging region (horizontal view-angle region) of the camera module 3; the imaging region substantially corresponds to the field of view of the lens assembly 3A This reduces the possibility that objects located outside of the sector imaging region of the camera module 3 are captured by the camera module 3.

The first thermal-conductive member 114 is designed as a seat member made of, for example, a silicone material having a thermal conductivity from 1 to 50 [W/m·K] inclusive. The first thermal-conductive member 114 is located between the attachment wall 25 of the housing 2 and the front windshield 102 via the opening 8a. For example, in the embodiment, the first thermal-conductive member 114 is adhered on the top surface of the attachment wall 25. Thereafter, the first thermal-conductive member 114 is fixed to the inner surface of the front windshield 102 via the second thermal-conductive member 115 while the first thermal-conductive member 114 and/or a top portion of the attachment wall 25 is fitted or placed in the opening 8a of the bracket 8. This results in the first thermal-conductive member 114 being adhered on the inner surface of the front windshield 102.

The first thermal-conductive member 114 has a shape and an area substantially identical to the shape and area of the top surface of the attachment wall 25. Specifically, the first thermal-conductive member 114 has a substantially concave shape and is fixedly mounted on regions 25b of the respective left-hand and right-hand ends 26 and 27 of the attachment wall 25 located both sides of the U-shaped concave recess 21a. The first thermal-conductive member 114 is also fixedly mounted on a region 25a of the concave top surface of the attachment wall 25 located behind the U-shaped concave recess 21a.

The second thermal-conductive member 115 is designed as a seat member made of, for example, the same material as the material of the first thermal-conductive member 114. The second thermal-conductive member 115 is disposed between the top surface 8c of the bracket 8 and the inner surface of the front windshield 102 so as to be fixedly mounted on both the top surface 8c of the bracket 8 and the inner surface of the front windshield 102.

The second thermal-conductive member 115 has a shape and an area substantially identical to the shape and area of the top surface 8c of the bracket 8. Specifically, the second thermal-conductive member 115 has an opening 115a facing the opening 8a of the bracket 8, and a substantially V-shaped recess 115b communicating with the opening 115a and facing the V-shaped recess 8b of the bracket 8; the opening 115a and the V-shaped recess 115b result in the second thermal-conductive member 115 has a substantially U shape.

The second thermal-conductive member 115 is adhered on the whole of the top surface 8c of the bracket 8 and on the inner surface of the front windshield 102 while the opening 115a and recess 115b are aligned with the respective opening 8a and recess 8b. For example, the second thermal-conductive member 115 is attached on both the whole of the top surface 8c of the bracket 8 and the inner surface of the front windshield 102 with adhesives.

In the embodiment, in order to reduce external visual recognition of the adhesive between the second thermal-conductive member 115 and the inner surface of the front windshield 102, the second thermal-conductive member 115 is adhered on a black ceramic sheet 103 having an area larger than the area of the second thermal-conductive member 115. Thereafter, the black ceramic sheet 103 is closely contacted on the inner surface of the front windshield 102. The black ceramic sheet 103 has a transparent opening 103a facing the V-shaped recess 115b of the second thermal-conductive member 115. The transparent opening 103a prevents the black ceramic sheet 103 from blocking the sector imaging region of the camera module 3.

The design cover 7 covers the bracket 8 and the hood 9 from the lower direction of them in addition to the imaging device 1 to reduce the possibility of the bracket 8 and hood 9 being visible from the inside of the vehicle V. The design cover 7 has a through hole 7a formed through a bottom wall; the ventilation fan 117 is fitted in the through hole 7a (see FIG. 4). The ventilation fan 117 ventilates the compartment of the vehicle V.

The hot wire 118 is designed as, for example a single copper wire having both ends connected to a power supply source (not shown) installed in the vehicle V, and the hot wire 118 generates heat when energized by the power supply source. For example, the hot wire 118 has a bent portion 118a shaped like a letter S, and is arranged on an inner surface of the black ceramic sheet 103 such that the S-shaped bent portion 118a is located on the inner side of the trapezoidal opening 103a. Specifically, the S-shaped bent portion 118a has substantially three linear portions and two corners joining between the three linear portions to form the substantially S shape. The S-shaped bent portion 118a is located on the trapezoidal opening 103a while the three linear portions pass through the trapezoidal opening 103a in the lateral direction of the black ceramic sheet 103. This permits the front side space of the lens assembly 3A of the camera module 3 located below the trapezoidal opening 103a to be efficiently heated.

Figure 6:
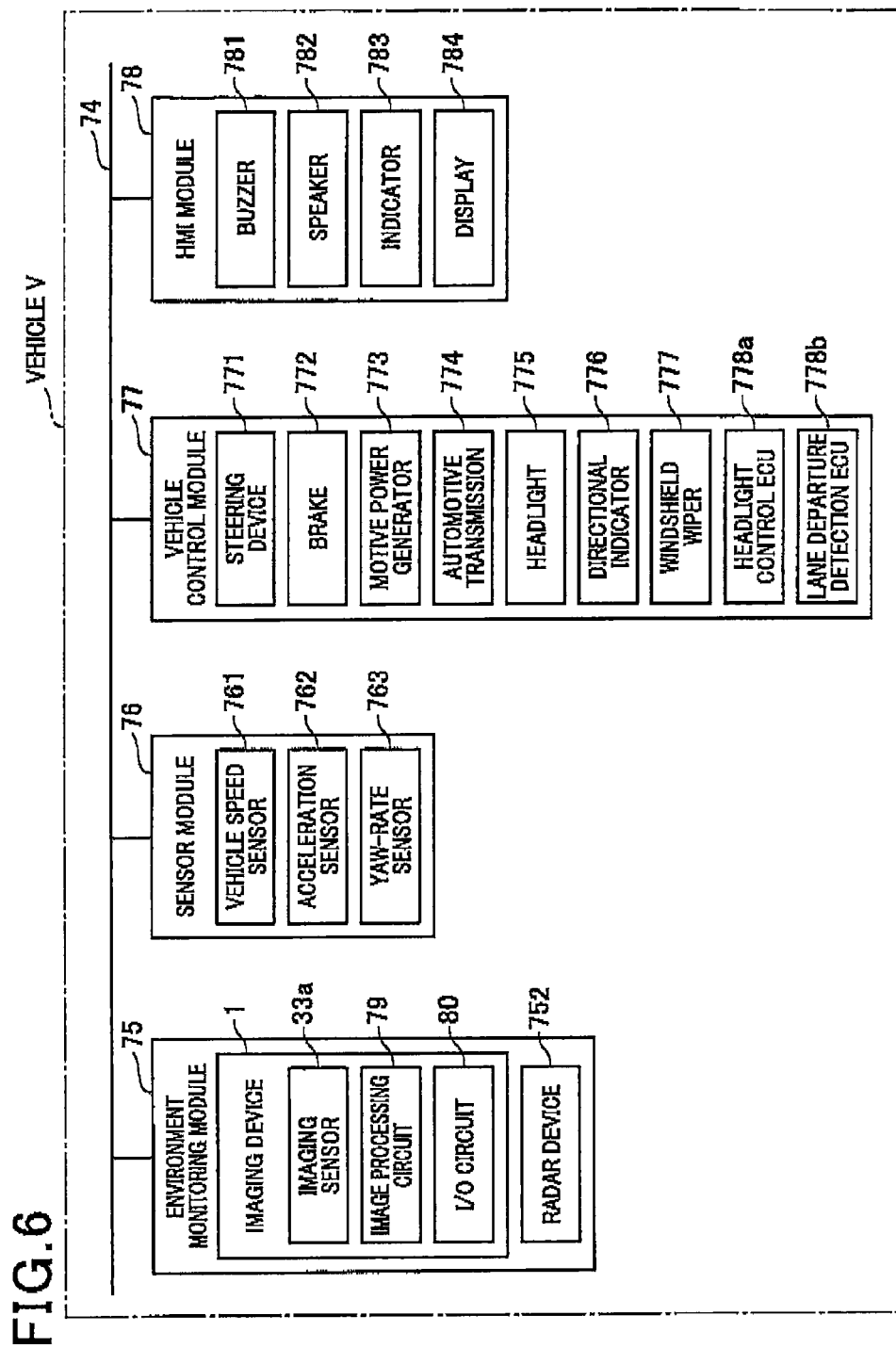
FIG. 6 is a block diagram schematically illustrating an example of a part of a functional structure of the vehicle including an example of the functional structure of the camera system.

Next, electrical functions of the camera system 100 will be described hereinafter with reference to FIG. 6. FIG. 6 schematically illustrate an example of a part of the functional structure of the vehicle V including an example of the functional structure of the camera system 100. In FIG. 6, electrical components of the imaging device 1 only are illustrated while other mechanical elements of the imaging device 1, such as the bracket 8 and hood 9, are eliminated in illustration.

Referring to FIG. 6, the vehicle V includes an environment monitoring module 75, a sensor module 76, a vehicle control module 77, an HMI (Human Machine Interface) module 78, and a common serial interactive communication bus 74 with which the modules 75 to 78 are communicably coupled.

The environment monitoring module 75 is equipped with, for example, the imaging device 1 and a radar device 752, which serve as devices for monitoring the environmental situations around the vehicle V. The environment monitoring module 75 can include, for example, a right side-view camera, a left side-view camera, and a rear-view camera. The right side-view camera is for example attached to the right side-view mirror of the vehicle V for picking up images of right-hand views from the vehicle V. The left side-view camera is for example attached to the left side-view mirror for picking up images of left-hand views from the vehicle V. The rear-view camera is for example attached to the rear bumper of the vehicle V for picking up rear views from the vehicle V.

The imaging device 1 functionally includes an image sensor 33a, an image processing circuit 79, and an input/output (I/O) circuit 80 described in detail later.

The radar device 752 is operative to transmit probing waves, such as radar waves or laser waves to a predetermined scan region, and receive echoes from at least one object based on the transmitted probing waves. Based on the received echoes, the radar device 752 is operative to generate object information including at least (1) The distance of the at least one object relative to the vehicle V (2) The relative speed of the at least one object with respect to the vehicle V if the at least one object is a moving object (3) The lateral position of the at least one object relative to the vehicle V in the lateral direction of the vehicle V.

The radar device 752 can include a sonar for transmitting ultrasonic waves as the probing waves and for receiving echoes based on the ultrasonic waves from at least one object.

The sensor module 76 is operative to measure the operating conditions, i.e. travelling conditions, of the vehicle V. Specifically, the sensor module 76 includes a vehicle speed sensor 761, an acceleration sensor 762, a yaw-rate sensor 763, and so on.

The vehicle speed sensor 761 is operative to measure the speed of the vehicle V, and operative to output, to the bus 74, a sensor signal indicative of the measured speed of the vehicle V.

The acceleration sensor 762 is operative to measure acceleration, for example, lateral acceleration, of the vehicle V in the vehicle width direction, and output, to the bus 74, a sensor signal indicative of the measured acceleration of the vehicle V.

The yaw-rate sensor 763 is operative to output, to the bus 74, a sensor signal indicative of an angular velocity around a vertical axis of the vehicle V as a yaw rate of the vehicle V.

That is, the sensor signals sent from the respective sensors 761, 762, and 763 are output to the vehicle control module 77 and the image processing circuit 79 of the environment monitoring module 75 via the bus 74. The sensor signals sent from the respective sensors 761, 762, and 763 can be input to ECUs installed in the vehicle V, such as an engine ECU. The ECUs can be operative to execute various tasks based on the input sensor signals, and output the executed results of the various tasks to the bus 74. At that time, the vehicle control module 77 and the image processing circuit 79 can receive the executed results of the various tasks via the bus 74.

The vehicle control module 77 is operative to control actuators included in target devices installed in the vehicle V, and is operative to control each of the actuators, thus controlling a corresponding one of the target devices based on the sensor signals sent from the respective sensors 761, 762, and 763. The target devices to be controlled include at least three types of devices included in a body system, a power-train system, and a chassis system of the vehicle V.

For example, the target devices include a steering device 771, a brake 772, a motive power generator 773, an automotive transmission 774, headlights 775, directional indicators 776, and windshield wipers 777.

The steering device 771 is operative to assist the driver's steering of the steering wheel of the vehicle V. The brake 772 is operative to slow down the vehicle V. The motive power generator 773 consists of, for example, an internal combustion engine and/or a motor, and is operative to generate motive power for travelling the vehicle V. The automotive transmission 774 is operative to convert a rotational speed and torque as the motive power generated by the motive power generator 773 into an adjusted rotational speed and adjusted torque, and supply the adjusted rotational speed and adjusted torque to driving wheels of the vehicle V.

The headlights 775 are operative to light up the road on which the vehicle V is travelling. Each of the directional indicators 776 is operative to flash when the vehicle V is about to turn in a corresponding direction, i.e. right or left, or to make a corresponding lane change. The windshield wipers 777 are operative to clean the respective front windshield 102 and rear windshield from rain, snow, or other moisture.

Note that the vehicle control module 77 includes ECUs 778 for controlling actuators installed in the vehicle V; the ECUs 778 include the headlight control ECU 778a and the lane departure detection ECU 778b.

The HMI module 78 is operative to provide interfaces between occupants in the vehicle V and the vehicle V. For example, the HMI module 78 includes a buzzer 781, a speaker 782, at least one indicator 783, at least one display 784, and actuators of the respective devices 781 to 784 installed in the vehicle V. The buzzer 781 is operative to output a warning sound, and the speaker 782 is operative to output audible information. The indicator 783 is operative to generating a light signal, and the at least one display 784 includes a navigation display and/or a head-up display installed in a center console of the vehicle V.

In addition, the HMI module 78 can include at least one vibration device and at least one reaction force generator (not shown). The at least one vibration device is comprised of a motor for generating vibrations of at least one of the steering wheel of the vehicle V and one or more seats of the vehicle V. The at least one reaction force generator is operative to generate reaction force to be supplied to at least one of the steering wheel of the vehicle V and a brake pedal of the vehicle V.

Specifically, the HMI module 78 is operative to activate at least one of these devices included therein to offer information to occupants of the vehicle V.

The HMI module 78 can include an adjusting unit that allows an occupant to input a desired level of recognition for a recognition task described later and/or a timing to start a determining task described later, thus transferring information from an occupant to the vehicle V.

The I/O circuit 80 is designed as a circuit included in various circuits implemented on and/or in the control circuit board 4, and operative to allow communications among the various circuits implemented in and/or on the control circuit board 4.

The image processing circuit 79 is designed as a circuit, such as an IC chip, included in the various circuits implemented on and/or in the control circuit board 4. The image processing circuit 79 is operative to perform the recognition task to recognize the environmental conditions around the vehicle V based on images picked up by the imaging device 1 and/or the other cameras and the object information measured by and sent from the radar device 752.

Figure 7:
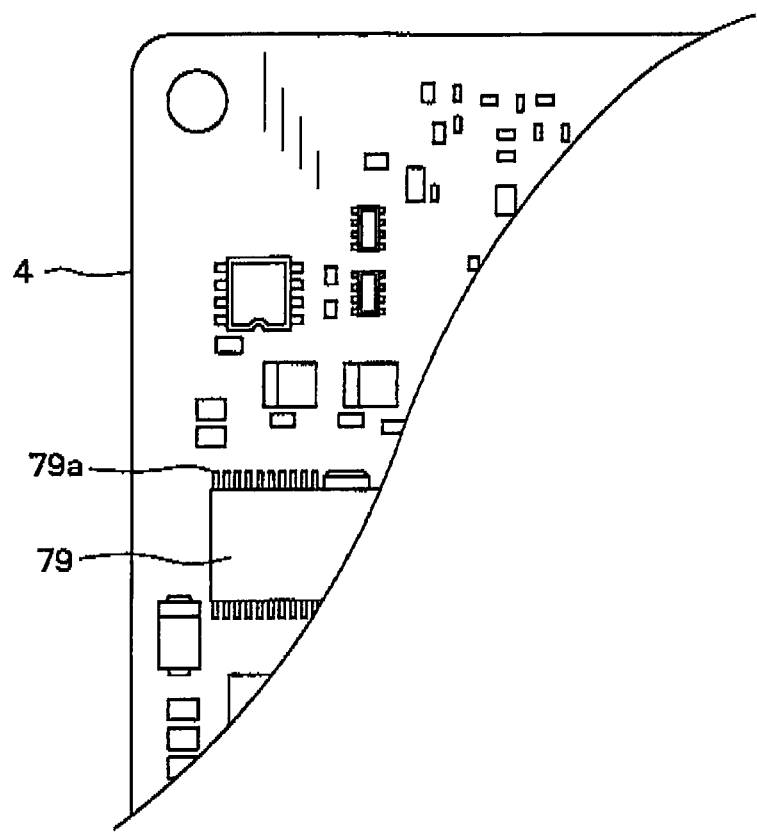
FIG. 7 is a view schematically illustrating a part of an image processing circuit implemented on a control circuit board of the imaging device.

The image processing circuit 79 is composed of, for example, an electronic circuit device, which contains 3.3 V signal lines, and is driven based on 3.3 V. For this reason, the image processing circuit 79 has lower power consumption and a lower heating value. Referring to FIG. 7, the image processing circuit 79 has for example external terminals 79a with 1.27 mm or lower pitches. This configuration of the image processing circuit 79 contributes to reduction of the image processing circuit 79 and the control circuit board 4 in size. Note that, as illustrated in FIG. 4, if the image processing circuit 79 consists of a single device, i.e. a single IC chip, the device preferably has external terminals with 1.27 mm or lower pitches. However, if the image processing circuit 79 consists of a plurality of devices, i.e. IC chips, at least one of the devices preferably has external terminals with 1.27 mm or lower pitches.

Figure 8:
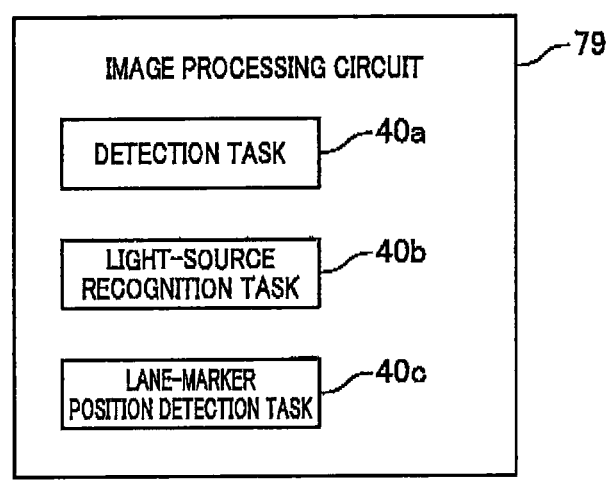
FIG. 8 is a block diagram schematically illustrating an example of the functional structure of the image processing circuit illustrated in FIG. 7.

Referring to FIG. 8, the image processing circuit 79 successively, i.e. cyclically, captures images successively picked up by the image sensor 33a of the camera module 3, and performs, for each of the captured images, a detection task 40a, a light-source recognition task 40b, and a lane-marker position detection task 40c as examples of image-recognition tasks.

The image processing circuit 79 performs the detection task 40a that determines whether there is at least one light source of a vehicle appearing in each of the captured images. Specifically, the image processing circuit 79 determines that there is at least one light source of a vehicle appearing in a currently captured image; the at least one region has at least one of (1) An average pixel value equal to or higher than a threshold pixel value (2) A shape similar to one of previously prepared shape patterns (3) An average color is similar to one of previously prepared color patterns.

When it is determined that there is at least one light source appearing in a currently captured image, the image processing circuit 79 identifies a position of the at least one light source on the currently captured image as coordinates on the currently captured image.

Next, the image processing circuit 79 performs the light-source recognition task 40b that determines whether the at least one light source is a light source, i.e. a tail lamp, of a preceding vehicle or a light source, i.e. a head lamp, of an oncoming vehicle using, for example, one of known methods. For example, the light-source recognition task 40b is designed to determine that the at least one light source is a light source of an oncoming vehicle when the average color of the at least one light source is within a predetermined color range similar to white. Otherwise, the light-source recognition task 40b is designed to determine that the at least one light source is a light source of a preceding vehicle when the average color of the at least one light source is within a predetermined color range similar to red. Thus, the light-source recognition task obtains information indicative of whether the at least one light source is a light source of a preceding vehicle or an oncoming vehicle.

Then, the image processing circuit 79 outputs, to the headlight control ECU 778a via the bus 74, the coordinates of the at least one light source appearing in a currently captured image and the obtained information as camera information in the form of signals. The camera information represents an example of the results of one or more image-recognition tasks.

Note that the image processing circuit 79 is not limited to outputting camera information each time it is determined that there is at least one light source of a vehicle appearing in a currently captured image. Specifically, the image processing circuit 79 can be configured to determine whether the image processing circuit 79 should output camera information to the headlight control ECU 778a based on information included in the sensor signals sent from the respective sensors 761, 762, and 763. The image processing circuit 79 can be configured to output camera information to the headlight control ECU 778a when it is determined that the image processing circuit 79 should output camera information to the headlight control ECU 778a. Otherwise, the image processing circuit 79 can be configured not to output camera information to the headlight ECU 778a when it is determined that the image processing circuit 79 should not output camera information to the headlight control ECU 778a.

The information used by the determination of whether the image processing circuit 79 should output camera information to the headlight control ECU 778a is included in the sensor signals sent from the respective sensors 761, 762, and 763 to the bus 74, which is referred to as vehicle sensor information, but the present disclosure is not limited thereto. Specifically, the sensor signals sent from the respective sensors 761, 762, and 763 via the bus 74 can be processed by another ECU, and thereafter, the processed sensor signals can be output to the image processing circuit 79. Then, the image processing circuit 79 uses, as the vehicle sensor information, information included in the processed sensor signals.

Specifically, the image processing circuit 79 obtains, from the vehicle sensor information, values of vehicle behavior parameters, such as the speed of the vehicle V, the acceleration of the vehicle V, and the yaw-rate of the vehicle V. Then, the image processing circuit 79 determines whether the obtained values of the vehicle behavior parameters are within respective first threshold ranges. Specifically, the image processing circuit 79 determines whether (1) The obtained value of the vehicle speed is equal to or lower than a predetermined first threshold speed (2) An absolute value of the obtained acceleration is equal to or lower than a predetermined first threshold value (3) The obtained value of the yaw-rate is equal to or lower than a predetermined first threshold rate.

Let us consider a first case where the obtained values of the vehicle behavior parameters are beyond the respective first threshold ranges. In other words, let us consider a first case where the obtained value of the vehicle speed is higher than the first threshold speed, the absolute value of the obtained acceleration is higher than the first threshold value, and the obtained value of the yaw-rate is higher than the first threshold rate.

In the first case, the image processing circuit 79 determines that the image processing circuit 79 should output camera information to the headlight control ECU 778a.

Otherwise, let us consider a second case where the obtained values of the vehicle behavior parameters are within the respective first threshold ranges. In other words, let us consider a second case where the obtained value of the vehicle speed is equal to or lower than the first threshold speed, the absolute value of the obtained acceleration is equal to or lower than the first threshold value, and the obtained value of the yaw-rate is higher than the first threshold rate. In the second case, the image processing circuit 79 determines that the image processing circuit 79 should not output camera information to the headlight control ECU 778a.

When receiving the camera information sent from the image processing circuit 79 and the sensor signals sent from the respective sensors 761 to 763, the headlight control ECU 778a is configured to (1) Send, to first actuators of the respective headlights via the bus 74, control signals for changing the beams of light output from the respective headlights 775 between high and low beams (2) Send, to second actuators of the respective headlights via the bus 74, control signals for swiveling the axes of the beams of light output from the respective headlights 775 in the lateral direction of the vehicle V.

As described above, the headlight control ECU 778a uses the camera information for controlling the first and second actuators. In other words, the camera information serves as signals to control the first and second actuators.

In addition, the image processing circuit 79 performs, as the lane-marker detection task 40c, a known lane-marker detection task for each of the captured images. For example, the image processing circuit 79 detects, for each of the captured images, positions of lane markers painted on the road ahead of the vehicle V on which the vehicle V is travelling using a binarizing process of a corresponding one of the captured images and a Hough transformation process. Then, the image processing circuit 79 outputs, to the lane departure detection ECU 778b via the bus 74, the positions of the lane markers as lane-marker position information.

Note that the image processing circuit 79 is not limited to outputting lane-marker position information each time the image processing circuit 79 captures an image output from the image sensor 33a.

Specifically, the image processing circuit 79 can be configured to determine whether the image processing circuit 79 should output lane-marker position information to the lane departure detection ECU 778b based on the vehicle sensor information included in the sensor signals sent from the respective sensors 761, 762, and 763. The image processing circuit 79 can be configured to output lane-marker position information to the lane departure detection ECU 778b when it is determined that the image processing circuit 79 should output lane-marker position information the lane departure detection ECU 778b. Otherwise, the image processing circuit 79 can be configured not to output lane-marker detection information to the lane departure detection ECU 778*b* when it is determined that the image processing circuit 79 should not output lane-marker detection information to the lane departure detection ECU 778*b*.

The vehicle sensor information used by the determination of whether the image processing circuit 79 should output lane-marker detection information to the lane departure detection ECU 778*b* is included in the sensor signals sent from the respective sensors 761, 762, and 763 to the bus 74, but the present disclosure is not limited thereto. Specifically, the sensor signals sent from the respective sensors 761, 762, and 763 via the bus 74 can be processed by another ECU, and thereafter, the processed sensor signals can be output to the headlight ECU 778*a*. Then, the image processing circuit 79 uses, as the vehicle sensor information, information included in the processed sensor signals.

Specifically, the image processing circuit 79 obtains, from the vehicle sensor information, values of the vehicle behavior parameters, such as the speed of the vehicle V, the acceleration of the vehicle V, and the yaw-rate of the vehicle V. Then, the image processing circuit 79 determines whether the obtained values of the vehicle behavior parameters are within respective second threshold ranges that can be equal to or different from the respective first threshold ranges. Specifically, the image processing circuit 79 determines whether (1) The obtained value of the vehicle speed is equal to or lower than a predetermined second threshold speed (2) An absolute value of the obtained acceleration is equal to or lower than a predetermined second threshold value (3) The obtained value of the yaw-rate is equal to or lower than a predetermined second threshold rate.

Let us consider a first case where the obtained values of the vehicle behavior parameters are beyond the respective second threshold ranges. In other words, let us consider a first case where the obtained value of the vehicle speed is higher than the second threshold speed, the absolute value of the obtained acceleration is higher than the second threshold value, and the obtained value of the yaw-rate is higher than the second threshold rate.

In the first case, the image processing circuit 79 determines that the image processing circuit 79 should output lane-marker detection information to the lane departure detection ECU 778*b*.

Otherwise, let us consider a second case where the obtained values of the vehicle behavior parameters are within the respective second threshold ranges. In other words, let us consider a second case where the obtained value of the vehicle speed is equal to or lower than the second threshold speed, the absolute value of the obtained acceleration is equal to or lower than the second threshold value, and the obtained value of the yaw-rate is higher than the second threshold rate. In the second case, the image processing circuit 79 determines that the image processing circuit 79 should not output lane-marker detection information to the lane departure detection ECU 778*b*.

When receiving the lane-marker detection information sent from the image processing circuit 79 and the sensor signals sent from the respective sensors 761 to 763, the lane departure detection ECU 778*b* is configured to determine whether (1) A probability of the vehicle V unintentionally leaving, i.e.

departing from, a lane on which the vehicle V is running is higher than a threshold probability or (2) The vehicle V has unintentionally left a lane on which the vehicle V was running.

The lane departure detection ECU 778*b* controls a corresponding actuator of at least one of the warning devices 781 to 784 to activate it when it is determined that (1) The probability of the vehicle V unintentionally leaving the lane on which the vehicle V is running is higher than the threshold probability or (2) The vehicle V has unintentionally left the lane on which the vehicle V was running.

The at least one of the warning devices 781 to 784 is activated to output warning information for the occupants of the vehicle V.

The lane departure detection ECU 778*b* can send a control signal to the actuator of the steering device 771 to adjust the steering angle of the steering wheel when it is determined that (1) The probability of the vehicle V unintentionally leaving the lane on which the vehicle V is running is higher than the threshold probability or (2) The vehicle V has unintentionally left the lane on which the vehicle V was running.

The adjustment of the steering angle of the steering wheel prevents the vehicle V from unintentionally leaving the lane or returns the vehicle V, which unintentionally left the lane, to the lane.

As described above, the lane departure detection ECU 778*b* uses the lane-marker detection information for controlling the actuators of at least one of the warning devices 781 to 784 and the steering device 771. In other words, the lane-marker detection information serves as signals to control the actuators of the one or more warning devices 781 to 784 and the steering device 771 installed in the vehicle V.

As described above, the image processing circuit 79 successively captures images successively sent from the image sensor 33*a*, and obtains the sensor signals sent from the respective sensors 761 to 763 via the bus 74. Then, the image processing circuit 79 performs various tasks including the tasks 40*a* to 40*c* set forth above, based on the captured images and the sensor signals. Based on the results of the various tasks and the sensor signals, the image processing circuit 79 outputs control signals to at least one of the actuators of target devices to be controlled by at least one of the vehicle control module 77 and the HMI module 78.

Next, the structure of the camera module 3 according to the embodiment will be described in detail with reference to FIGS. 9 and 10.

The camera module 3 includes the lens assembly 3A. The lens assembly 3A is comprised of a lens barrel 31 including a plurality of lenses, and a lens holder 32. The camera module 3 also includes a camera board 33.

The lens barrel 31 includes a tubular body 31*a* made of, for example, a resin in which the plurality of lenses (for example, 311 to 314 illustrated in FIG. 13) are disposed to be coaxially aligned with each other. The lens holder 32 is made of, for example, a resin, and holds the lens barrel 31 to thereby hold the plurality of lenses 311 to 314. The lens barrel 31 can be integrally formed with the lens holder 32, so that the lens holder 32 directly holds the plurality of lenses 311 to 314.

The lens holder 32 has a substantially plate-like base 32*a* constituting a second air-passage defining structure described later. The base 32*a* is arranged such that its major surfaces are directed to the front and rear directions of the vehicle V. The lens holder 32 also has a tubular holding body 320 attached to one major surface, i.e. a front surface, of the base 32*a* such that a center axis of the tubular holding body 320 extends along the front-rear direction of the vehicle V. The tubular holding body 320 holds the lens barrel 31 such that the optical axes 310 of the lenses 311 to 314 are aligned with the center axis thereof.

The camera board 33 is implemented with the image sensor 33a for picking up images of a region ahead of the vehicle V. The camera board 33 is fixedly attached to the other major surface, i.e. the rear surface, of the base 32a such that the center of the image sensor 33a is located through which the optical axis 310 of the lenses 311 to 314 passes. The camera module 3 is installed in the housing 2 such that the camera board 33 faces the opening 21 of the housing 2.

A two-dimensional CMOS image sensor comprised of CMOS semiconductor cells arranged in a two-dimensional array or a two-dimensional CCD image sensor comprised of photodiodes arranged in a two-dimensional array can be used as the image sensor 33a.

Note that the electrical connection harness 5 is for example designed as a wiring board, such as a flexible printed wiring board, and wires printed on the wiring board connect the image sensor 33a and other elements implemented on the camera board 33 to the circuits including the image processing circuit 79 and implemented on the control circuit substrate 4.

Figure 9:
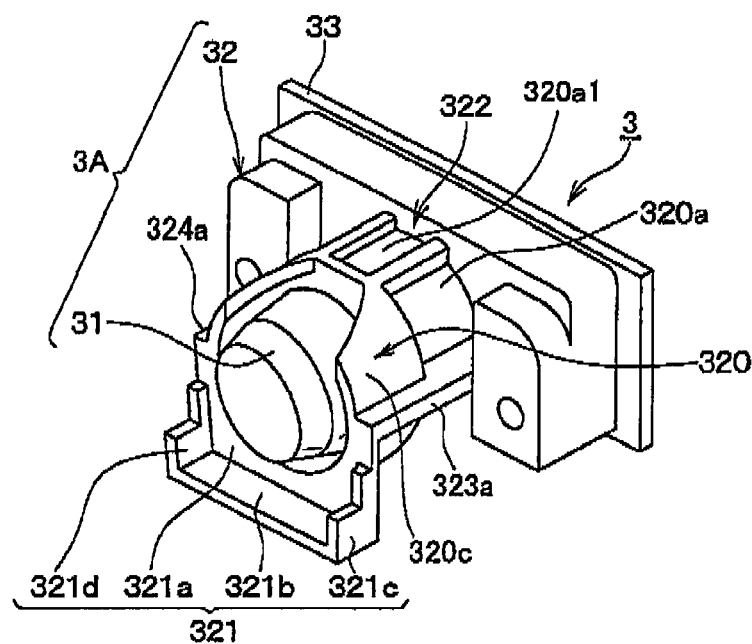
FIG. 9 is a perspective view of a camera module of the imaging device illustrated in FIG. 1.
Figure 10:
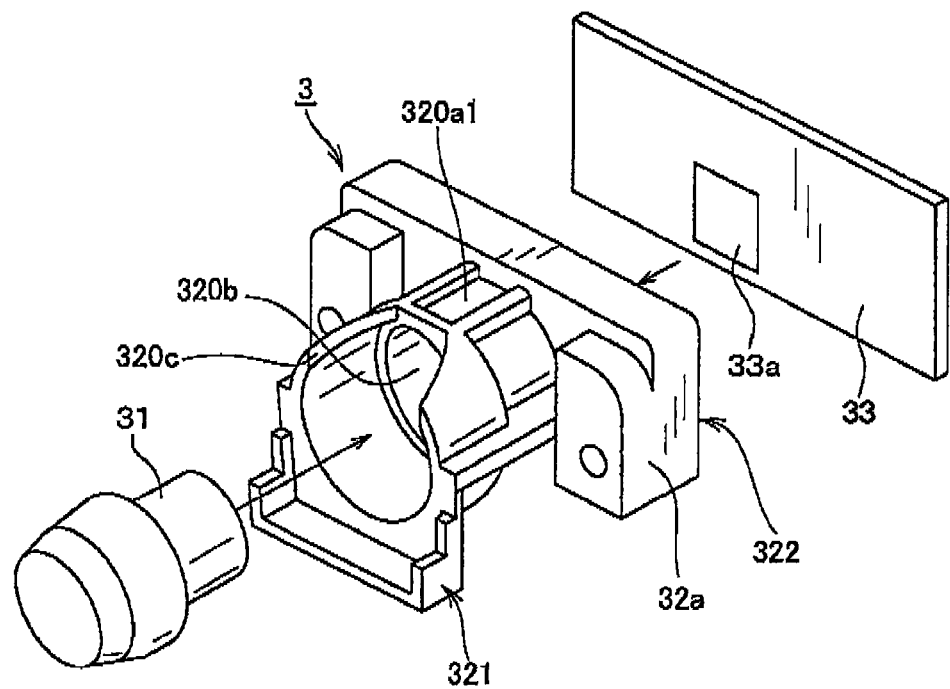
FIG. 10 is an exploded perspective view of the camera module illustrated in FIG. 9.

Referring to FIG. 9, the tubular holder body 320 has an upper semi-tubular wall 320a mounted on the front surface of the base 32a and having an opening 320b in which one end, i.e. a rear-side end, of the lens barrel 31 is fitted. The tubular holder body 320 also has a surrounding wall 320c having a substantially C shape with both upper ends spaced apart. The surrounding wall 320c extends integrally from the annular periphery of the upper semi-tubular wall 320a in the front direction of the vehicle V, and surrounds the other end, i.e. a front-side end, of the lens barrel 31.

The lens holder 32 includes a first air-passage defining structure 321, a second air-passage defining structure 322, a third air-passage defining structure 323, and a fourth air-passage defining structure 324; these structures, i.e. mechanisms, are integrally formed with the tubular holder body 320. Each of the first to fourth air-passage defining structures 321 to 324 is configured to define a corresponding passage for guiding air, which is entering, through the opening 21 of the housing 2 from the outside thereof, the inside the housing 2 while detouring the air into the inside of the housing 2. This results in reduction of the possibility that condensation occurs on each of the control circuit board 4 and the camera board 33.

The first air-passage defining structure 321 is comprised of a plate-like flange wall 321a extending, from the lower side of the periphery of the surrounding wall 320c, toward the lower side and the lateral side thereof and perpendicular to the front-rear direction of the vehicle V. The first air-passage defining mechanism 321 is also comprised of a plate-like bottom wall 321b continuously extending from a lower end of the flange wall 321a in the front direction of the vehicle V and perpendicular to the flange wall 321a, the flange wall 321a extending in the vertical direction of the vehicle V.

The first air-passage defining structure 321 includes a plate-like left-hand wall 321c continuously extending from a left-hand end of the flange wall 321a and a left-hand end of the bottom wall 32 lb perpendicular to the flange wall 321a and the bottom wall 321b.

The first air-passage defining structure 321 includes a plate-like right-hand wall 321d continuously extending from a right-hand end of the flange wall 321a and a right-hand end of the bottom wall 321b perpendicular to the flange wall 321a and the bottom wall 321b.

The second air-passage defining structure 322 is comprised of the plate-like base 32a. The base 32a is designed to have the major surfaces, i.e. front and rear surfaces, larger than the area of the annular end of the upper semi-tubular wall 320a mounted on the front surface of the base 32a. In other words, the upper semi-tubular wall 320a of the tubular holder body 320 is mounted on a substantially center portion of the front surface of the base 32a.

The third air-passage defining structure 323 is comprised of a plate-like projection 323a projecting in the left direction from a radially leftmost edge of the upper semi-tubular wall 320a and a radially leftmost edge of the surrounding wall 320c.

The fourth air-passage defining structure 324 is comprised of a plate-like projection 324a projecting in the right direction from a radially rightmost edge of the upper semi-tubular wall 320a and a radially rightmost edge of the surrounding wall 320c.

Next, the respective first to fourth air-passage defining structures 321 to 324 when the camera module 3 is installed in the housing 2 will be described in detail hereinafter with reference to FIGS. 11 to 14.

First, the first air-passage defining structure 321 for defining a first air-passage located below the lens barrel 31 will be described hereinafter.

Figure 13:
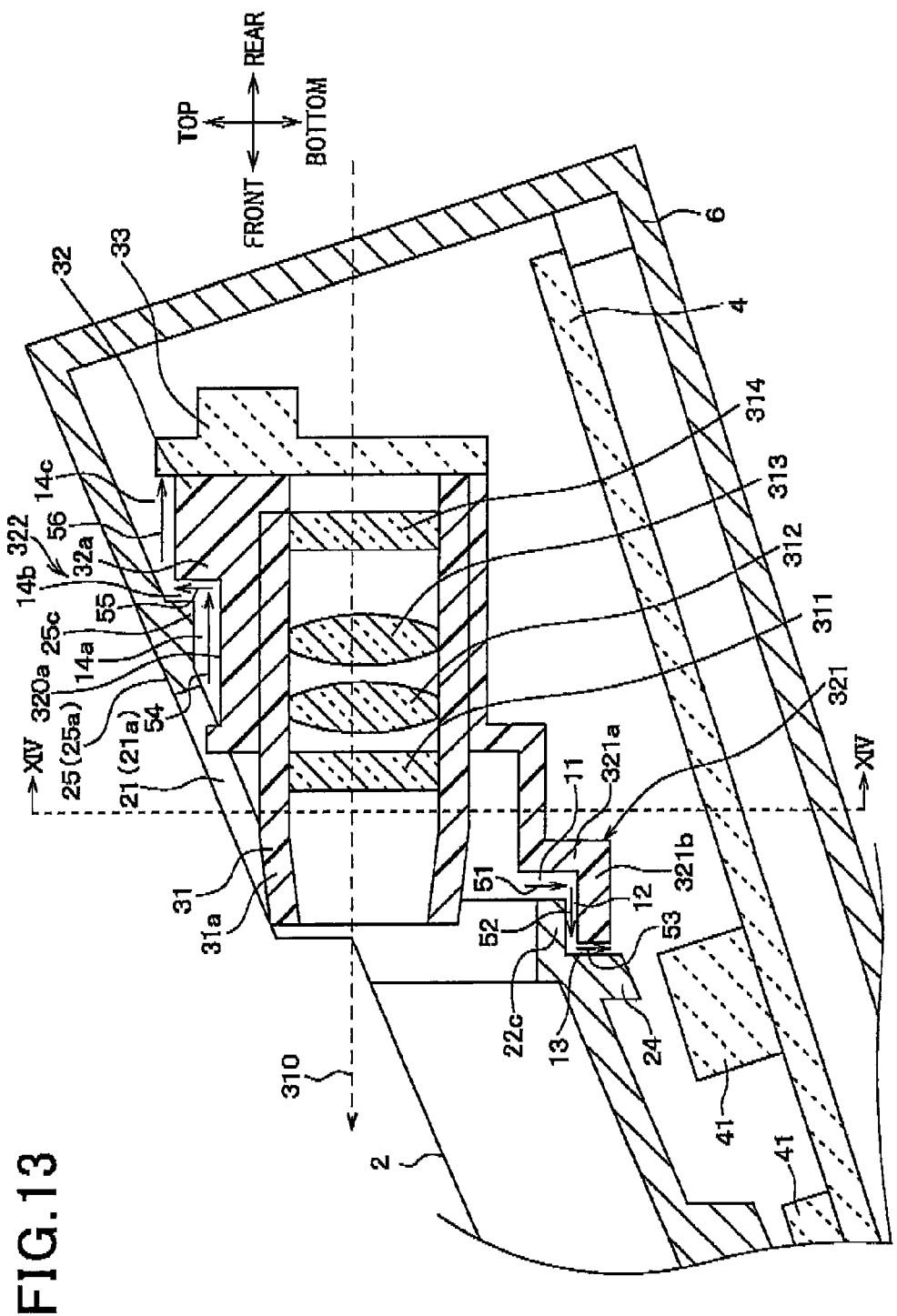
FIG. 13 is a cross sectional view taken along line XIII-XIII of FIG. 2.

The first air-passage defining structure 321 is comprised of the concave recess 22c in addition to the walls 321a to 321d. Referring to FIG. 13, the concave recess 22c has a rear-side surface located to face a front surface of the flange wall 321a with a slight clearance therebetween in the front-rear direction. The clearance constitutes a lower upstream air-passage 11. In other words, the concave recess 22c and the flange wall 321a constitute the lower upstream air-passage 11.

In addition, the concave recess 22c has a bottom surface located to face a top surface of the bottom wall 32 lb with a slight clearance therebetween in the vertical direction. The clearance constitutes a lower midstream air-passage 12. In other words, the concave recess 22c and the bottom wall 32 lb constitute the lower midstream air-passage 12. The lower upstream air-passage 11 extends in the vertical direction, and the lower midstream air-passage 12 communicates with the lower upstream air-passage 11 and extends, perpendicular to the extending direction of the lower upstream air-passage 11, in the forward direction from the lower end of the lower upstream air-passage 11. In other words, the assembly of the air-passages 11 and 12 has a portion bent at a suitable angle, for example right angles, between the air-passages 11 and 12.

The lower upstream air passage 11 forcibly guides air, such as warm air, which is entering through the opening 21 toward the inside of the housing 2, to be oriented downward (see arrow 51 in FIG. 13). The top surface of the bottom wall 321b changes the orientation 51 of the air flowing through the lower upstream air-passage 11 to the orientation (see arrow 52 in FIG. 13) bypassing the control circuit board 4 at the lowermost end of the lower upstream air-passage 11. This guides the air flowing through the lower upstream air-passage 11 into the lower midstream air-passage 12. The lower midstream air-passage 12 continuously guides the air to the orientation 52 to be detoured from the control circuit board 4.

The area formed by the periphery of the opening 21 of the housing 2 serves as an entrance connecting between the outside and inside of the housing 2. In other words, if the closed curve of the periphery of the opening 21 consists of a plurality of points, a line between each of the points with respect to a corresponding point of the lens holder 32, which has the shortest distance therebetween, is referred to as a minimum line. In this case, a plane constructed to contain all the minimum lines serves as the entrance connecting between the outside and inside of the housing 2. In other words, the entrance serves as a boundary plane between the outside and inside of the housing 2.

The first air-passage defining structure 321 has a partition wall 24 projecting downward from the lower end of the front portion of the concave recess 22c.

The partition wall 24 has a rear surface located to face a front surface of the bottom wall 321b with a slight clearance therebetween in the front-rear direction. The clearance constitutes a lower downstream air-passage 13. In other words, the bottom wall 32 lb and the partitioning wall 24 constitute the lower downstream air-passage 13. The lower downstream air-passage 13 has an upper end communicating with the front end of the lower midstream air-passage 12, and extends, perpendicular to the extending direction of the lower midstream air-passage 12, downward toward one of components 41 implemented on the control circuit board 4 (see arrow 53 in FIG. 13); the one of the components 41 faces the lower downstream air-passage 13. In other words, the assembly of the air-passages 12 and 13 has a portion bent at a suitable angle, for example right angles, between the air-passages 12 and 13.

Specifically, the lower upstream air-passage 11, the lower midstream air-passage 12, and the lower downstream air-passage 13 constitute the first air-passage defined by the first air-passage defining structure 321, to which a reference numeral (11, 12, 13) will be assigned. The first air-passage (11, 12, 13) has two corners through each of which the orientation of air entering the first air-passage (11, 12, 13) is changed. In other words, the first air-passage (11, 12, 13) has a substantially crank shape including two portions each bent at, for example, right angles. To put it another way, the first air-passage (11, 12, 13) is stepped to have one step as an example of a labyrinth structure. Each of the two portions of the first air-passage (11, 12, 13) is not limited to be bent at right angles, and can be bent at other desired angles.

From another perspective, the first air-passage defining structure 321 narrows a space around the lens barrel 31 in the housing 2 to the first air-passage (11, 12, 13) comprised of the lower upstream air-passage 11, the lower midstream air-passage 12, and the lower downstream air-passage 13. That is, air, which tries to enter the inside of the housing 2 via the opening 21, flows from a wide space around the opening 21, i.e. the entrance of the housing 2, into the narrowed first air-passage (11, 12, 13), and thereafter, flows into a wide space in the housing 2.

The first air-passage defining structure 321 causes air to (1) Flow through the lower upstream passage 11 downward (see the arrow 51) to hit the top surface of the bottom 321b (2) Change in orientation to flow through the lower midstream passage 12 in the front direction (see the arrow 52) deviated from, i.e.

the control circuit board 4 to hit the rear surface of the partition wall 24

(3) Change in orientation to flow through the lower downstream passage 13 downward (see the arrow 53) so as to flow in the housing 2.

Thus, even if the air flowing out of the lower downstream passage 13 finally hits the control circuit board 4, the air has flowed through such a labyrinthine course of the first air-passage (11, 12, 13), so that the air has travelled a long distance and has hit the top surface of the bottom 32 lb and the rear surface of the partition wall 24 two times. This results in the air, which has travelled a long distance, being sufficiently cooled before reaching the control circuit board 4.

The flow of air, which enters the inside of the housing 2 via the opening 21, passes through the narrowed passages 11, 12, and 13, so that the velocity of the flow of air is reduced. This reduces the possibility that air containing a water content reaches the control circuit board 4, thus reducing the possibility of the occurrence of condensation on the control circuit board 4.

Note that the size, i.e. the width, of the lower upstream passage 11 in the front-rear direction, the size, i.e. the width, of the lower midstream passage 12 in the vertical direction, and the size, i.e. the width, of the lower downstream passage 13 in the front-rear direction can be adjusted. The narrower one or more the passages 11 to 13 are, the more the velocity of the flow of air is reduced. From another viewpoint, the first air-passage (11, 12, 13) also serves as a route through which heat generated in the housing 2 is transferred to be exhausted from the opening 21 toward the outside of the housing 2.

For these reasons, the width, of the lower upstream passage 11 in the front-rear direction, the width, of the lower midstream passage 12 in the vertical direction, and the width, of the lower downstream passage 13 in the front-rear direction are preferably adjusted to satisfy both the capability of preventing condensation and the capability of transferring heat from the inside of the housing 2.

Next, the second air-passage defining structure 322 for defining a second air-passage located above the lens holder 32 will be described hereinafter.

Figure 11:
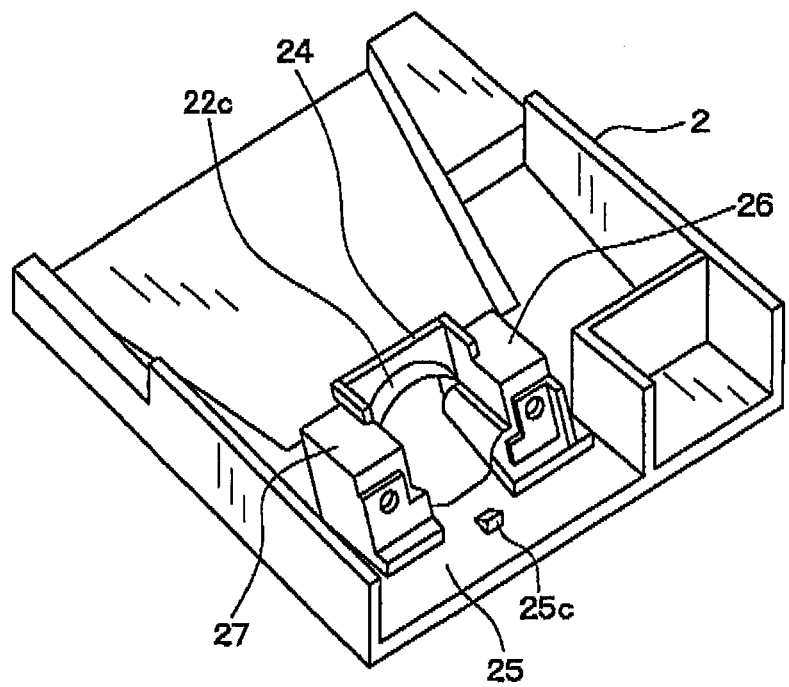
FIG. 11 is a perspective view schematically illustrating the inside of a housing illustrated in FIG. 1 before the camera module is installed in the housing.
Figure 12:
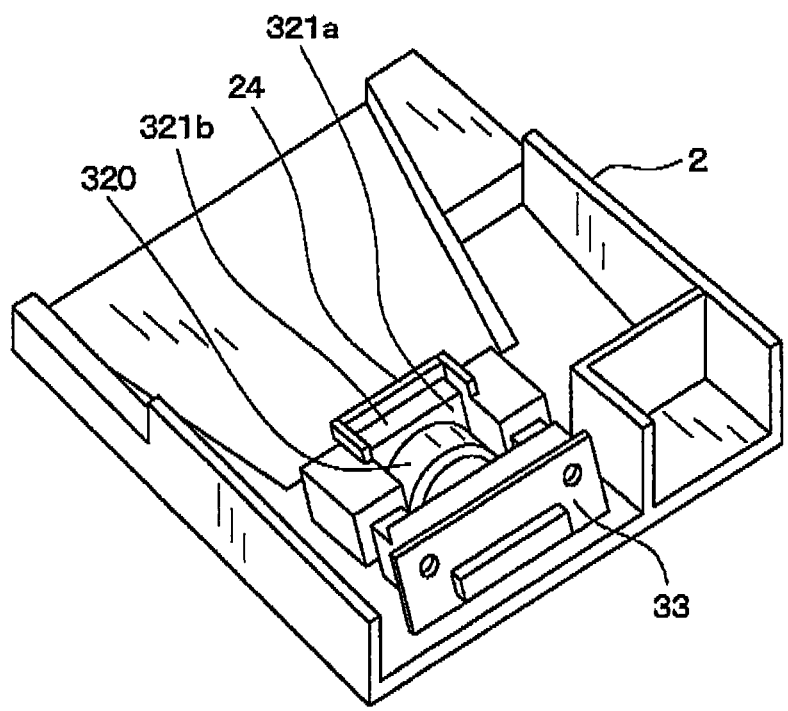
FIG. 12 is a perspective view schematically illustrating the inside of the housing illustrated in FIG. 1 after the camera module is installed in the housing.

Referring to FIGS. 11 and 13, the second air-passage defining structure 322 is comprised of a projection 25c formed on a portion of the bottom surface of the attachment wall 25 toward the upper semi-tubular wall 320a; the portion is located to face a top region 320a1 of the upper semi-tubular wall 320a. Specifically, the projection 25c has a bottom surface parallel to the top region 320a1 of the upper semi-tubular wall 320a with a slight clearance therebetween in the vertical direction. The clearance constitutes an upper upstream air-passage 14a. In other words, the projection 25c and the upper semi-tubular wall 320a constitute the upper upstream air-passage 14a.

In addition, referring to Fig .13, the projection 25c has a rear-side surface located to face the front surface of the base 32a with a slight clearance therebetween in the front-rear direction. The clearance constitutes an upper midstream air-passage 14b. In other words, the projection 25c and the base 32a constitute the upper midstream air-passage 14b. The upper upstream air-passage 14a extends in the front-rear direction, and the upper midstream air-passage 14b communicates with the rear end of the upper upstream air-passage 14a and extends, perpendicular to the extending direction of the upper upstream air-passage 14a, in the vertical direction from the rear end of the upper upstream air-passage 14a. In other words, the assembly of the air-passages 14a and 14b has a portion bent at a suitable angle, for example right angles, between the air-passages 14a and 14b.

Referring to FIG. 13, the bottom surface of the attachment wall 25 is located to face an upper surface of the base 32a with a slight clearance therebetween in the vertical direction. The clearance constitutes an upper downstream air-passage 14c. In other words, the attachment wall 25a and the base 32a constitute the upper downstream air-passage 14c. The upper downstream air-passage 14c has a front end communicating with the upper end of the upper midstream air-passage 14b, and extends, perpendicular to the extending direction of the upper midstream air-passage 14b, in the rear direction. In other words, the assembly of the air-passages 14b and 14c has a portion bent at a suitable angle, for example right angles, between the air-passages 14b and 14c.

The upper upstream air passage 14a forcibly guides air, such as warm air, which is entering through the opening 21 toward the inside of the housing 2, to be oriented in the rear direction (see arrow 54 in FIG. 13).

The front surface of the base 32a changes the orientation 54 of the air flowing through the upper upstream air-passage 14a to the orientation (see arrow 55 in FIG. 13) bypassing the camera board 33 at the rear end of the upper upstream air-passage 14a. This guides the air flowing through the upper upstream air-passage 14a into the upper midstream air-passage 14b. The upper midstream air-passage 14b continuously guides the air to the orientation 55 to be detoured from the camera board 33.

The bottom surface of the attachment wall 25 changes the orientation 55 of the air flowing through the upper midstream air-passage 14b to the orientation 56 in the rear direction. The upper downstream air-passage 14c continuously guides the air with the changed orientation 56 to the rear direction Specifically, the upper upstream air-passage 14a, the upper midstream air-passage 14b, and the upper downstream air-passage 14c constitute the second air-passage defined by the second air-passage defining structure 322, to which a reference numeral (14a, 14b, 14c) will be assigned. The second air-passage (14a, 14b, 14c) has two corners through each of which the orientation of air entering the second air-passage (14a, 14b, 14c) is changed. In other words, the second air-passage (14a, 14b, 14c) has a substantially crank shape including two portions each bent at, for example, right angles. To put it another way, the second air-passage (14a, 14b, 14c) is stepped to have one step as an example of a labyrinth structure. Each of the two portions of the second air-passage (14a, 14b, 14c) is not limited to be bent at right angles, and can be bent at other desired angles.

From another perspective, the second air-passage defining structure 322 narrows a space between the lens holder 32 and the attachment wall 25 to the second air-passage (14a, 14b, 14c) comprised of the upper upstream air-passage 14a, the upper midstream air-passage 14b, and the upper downstream air-passage 14c. That is, air, which tries to enter the inside of the housing 2 via the opening 21, flows from a wide space around the opening 21, i.e. the entrance of the housing 2, into the narrowed second air-passage (14a, 14b, 14c), and thereafter, flows into a wide space in the housing 2.

The second air-passage defining structure 322 causes air to (1) Flow through the upper upstream passage 14a in the rear direction (see the arrow 54) to hit the front surface of the base 32a (2) Change in orientation to flow through the upper midstream passage 14b in the vertical direction (see the arrow 55) so as not to be directed toward the camera board 33 to hit the bottom surface of the attachment wall 25

(3) Change in orientation to flow through the upper downstream passage 14c in the rear direction (see the arrow 56) so as to flow in the housing 2.

Thus, even if the air flowing out of the upper downstream passage 14c finally hits the camera board 33, the air has flowed through such a labyrinthine course of the second air-passage (14a, 14b, 14c), so that the air has travelled a long distance and has hit the front surface of the base 32a and the bottom surface of the attachment wall 25 two times. This results in the air, which has travelled a long distance, being sufficiently cooled before reaching the camera board 33. Note that, even if the air flowing out of the upper downstream air-passage 14c comes around behind the camera board 33, it is possible to reduce the possibility of the occurrence of condensation on the rear surface of the camera board 33.

The flow of air, which enters the inside of the housing 2 via the opening 21, passes through the narrowed passages 14a, 14b, and 14c, so that the velocity of the flow of air is reduced. This reduces the possibility that air containing a water content reaches the camera board 33, thus reducing the possibility of the occurrence of condensation on the camera board 33.

Note that the size, i.e. the width, of the upper upstream passage 14a in the vertical direction, the size, i.e. the width, of the upper midstream passage 14b in the front-rear direction, and the size, i.e. the width, of the upper downstream passage 14c in the vertical direction can be adjusted. The narrower one or more of the passages 14a to 14c are, the more the velocity of the flow of air is reduced. From another viewpoint, the second air-passage (14a, 14b, 14c) also serves as a route through which heat generated in the housing 2 is transferred to be exhausted from the opening 21 toward the outside of the housing 2.

For these reasons, the width of the upper upstream passage 14a in the vertical direction, the width of the upper midstream passage 14b in the front-rear direction, and the width of the upper downstream passage 14c in the vertical direction are preferably adjusted to satisfy both the capability of preventing condensation and the capability of transferring heat from the inside of the housing 2.

Next, the left air-passage defining structure 323 for defining a third air-passage located at the left side of the lens holder 32 will be described hereinafter.

Figure 14:
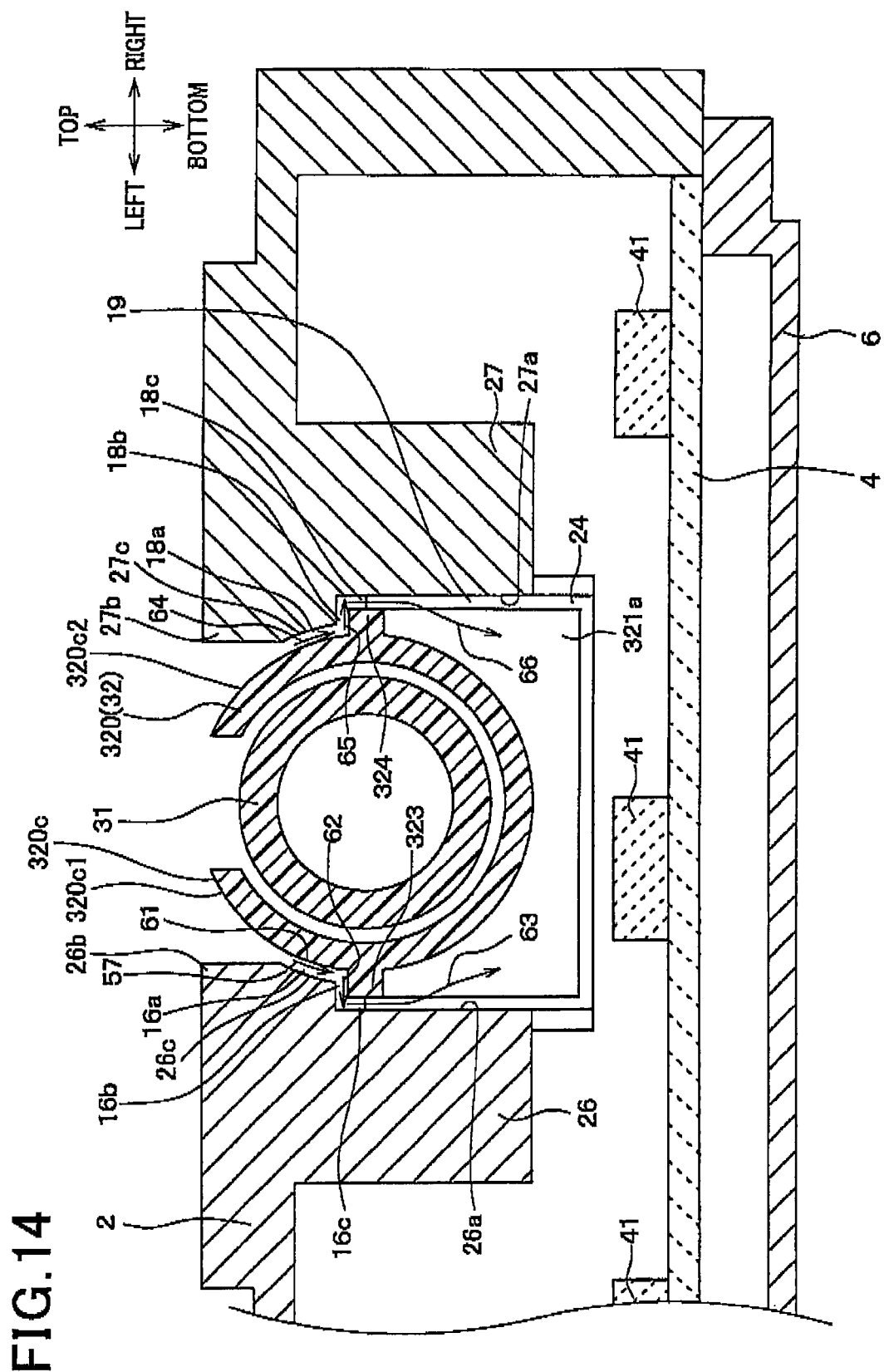
FIG. 14 is a cross sectional view taken along line XIV-XIV of each of FIGS. 2 and 13.

Referring to FIG. 14, the C-shaped surrounding wall 320c has a left-hand curved portion 320c1. The left-hand curved portion 320c1 is convexly curved from the left-hand upper end toward the radially leftmost edge of the C-shaped surrounding wall 320c, and faces the left-hand end 26 of the attachment wall 25.

The left-hand end 26 of the attachment wall 25 has an inner surface 26a that faces the surrounding wall 320c. The left-hand end 26 has a projection 26b projecting toward the left-hand curved portion 320c1 of the surrounding wall 320c. The projection 26b of the left-hand end 26 has a concavely curved inner surface 26c that faces the outer surface of the left-hand curved portion 320c 1 with a slight clearance therebetween. The clearance constitutes a left upstream air-passage 16a. In other words, the left air-passage defining structure 323 includes the left-hand end 26 of the attachment wall 25, and the surrounding wall 320c of the tubular holder body 320.

In addition, referring to FIG. 14, the C-shaped surrounding wall 320c has the projection 323a that projects in the left direction from the radially leftmost edge of the C-shaped surrounding wall 320c.

The projection 26b of the left-hand end 26 has a bottom surface that faces an upper surface of the projection 323a with a slight clearance therebetween. The clearance constitutes a left midstream air-passage 16b. In other words, the left air-passage defining structure 323 includes the left-hand end 26 of the attachment wall 25, and the surrounding wall 320c of the tubular holder body 320.

The left upstream air-passage 16a extends downward along the outer surface of the left-hand curved portion 320c1, and the left midstream air-passage 16b communicates with the lower end of the left upstream air-passage 16a, and extends, across the extending direction of the left upstream air-passage 16a, in the left-hand direction from the lower end of the left upstream air-passage 16a.

Referring to FIG. 14, the inner surface 26a of the left-hand end 26 of the attachment wall 25 faces the left-hand surface of the projection 323a with a slight clearance therebetween in the vehicle width direction. The clearance constitutes a left downstream air-passage 16c. In other words, the left air-passage defining structure 323 includes the left-hand end 26 of the attachment wall 25, and the surrounding wall 320c of the tubular holder body 320.

The left downstream air-passage 16c communicates with the left-hand end of the left midstream air-passage 16b, and extends, perpendicular to the extending direction of the left midstream air-passage 16b, downward from the left-hand end of the left midstream air-passage 16b. In other words, the assembly of the air-passages 14b and 14c has a portion bent at a suitable angle, for example right angles, between the air-passages 14b and 14c.

The left-hand upstream air passage 16a forcibly guides air, such as warm air, which is entering through the opening 21 toward the inside of the housing 2, to be oriented downward along the outer surface of the left-hand curved portion 320c1 (see arrow 61 in FIG. 14). The upper surface of the projection 323a changes the orientation 61 of the air flowing through the left upstream air-passage 16a to the orientation (see arrow 62 in FIG. 14) bypassing the control circuit board 4 at the lower end of the left upstream air-passage 16a. This guides the air flowing through the left upstream air-passage 16a into the left midstream air-passage 16b. The left midstream air-passage 16b continuously guides the air to the orientation 62 so as not to be directed toward the control circuit board 4.

The inner surface 26a of the left-hand end 26 of the attachment wall 25 changes the orientation 62 of the air flowing through the left midstream air-passage 16b downward in the orientation 63. The left downstream air-passage 16c continuously guides the air downward.

Specifically, the left upstream air-passage 16a, the left midstream air-passage 16b, and the left downstream air-passage 16c constitute the third air-passage defined by the third air-passage defining structure 323, to which a reference numeral (16a, 16b, 16c) will be assigned. The third air-passage (16a, 16b, 16c) has two corners through each of which the orientation of air entering the third air-passage (16a, 16b, 16c) is changed.

In other words, the third air-passage (16a, 16b, 16c) has a substantially crank shape including two portions each bent at, for example, right angles. To put it another way, the third air-passage (16a, 16b, 16c) is stepped to have one step as an example of a labyrinth structure. Each of the two portions of the third air-passage (16a, 16b, 16c) is not limited to be bent at right angles, and can be bent at other desired angles.

From another perspective, the third air-passage defining structure 323 narrows a space between the lens holder 32 and the left-hand end 26 of the attachment wall 25 to the third air-passage (16a, 16b, 16c) comprised of the left upstream air-passage 16a, the left midstream air-passage 16b, and the left downstream air-passage 16c. That is, air, which tries to enter the inside of the housing 2 via the opening 21, flows from a wide space around the opening 21, i.e. the entrance of the housing 2, into the narrowed third air-passage (16a, 16b, 16c), and thereafter, flows into a wide space in the housing 2.

The third air-passage defining structure 323 causes air to (1) Flow through the left upstream passage 16a downward along the outer surface of the left-hand curved portion 320c1 (see arrow 61) to hit the upper surface of the projection 323a (2) Change in orientation to flow through the left midstream passage 16b in the left direction (see the arrow 62) so as not to be directed toward the control circuit board 4 to hit the inner surface 26a of the left-hand end 26 of the attachment wall 25

(3) Change in orientation to flow through the left downstream passage 16c downward (see the arrow 63) so as to flow in the housing 2.

Thus, even if the air flowing out of the left downstream passage 16c finally hits the control circuit board 4, the air has flowed through such a labyrinthine course of the third air-passage (16a, 16b, 16c), so that the air has travelled a long distance and has hit the upper surface of the projection 323a and the inner surface 26a of the left-hand end 26 of the attachment wall 25 two times. This results in the air, which has travelled a long distance, being sufficiently cooled before reaching the control circuit board 4.

The flow of air, which enters the inside of the housing 2 via the opening 21, passes through the narrowed passages 16a, 16b, and 16c, so that the velocity of the flow of air is reduced. This reduces the possibility that air containing a water content reaches the control circuit board 4, thus reducing the possibility of the occurrence of condensation on the control circuit board 4.

Note that the size, i.e. the width, of the left upstream passage 16a in the vehicle width direction, the size, i.e. the width, of the left midstream passage 16b in the vertical direction, and the size, i.e. the width, of the left downstream passage 16c in the vehicle width direction can be adjusted. The narrower one or more the passages 16a to 16c are, the more the velocity of the flow of air is reduced. From another viewpoint, the third air-passage (16a, 16b, 16c) also serves as a route through which heat generated in the housing 2 is transferred to be exhausted from the opening 21 toward the outside of the housing 2.

For these reasons, the width of the left upstream passage 16a in the vehicle width direction, the width of the left midstream passage 16b in the vertical direction, and the width of the left downstream passage 16c in the vehicle width direction are preferably adjusted to satisfy both the capability of preventing condensation and the capability of transferring heat from the inside of the housing 2.

Next, the right air-passage defining structure 324 for defining a fourth air-passage located at the right side of the lens holder 32 will be described hereinafter.

Referring to FIG. 14, the C-shaped surrounding wall 320c has a right-hand curved portion 320c2. The right-hand curved portion 320c2 is convexly curved from the right-hand upper end toward the radially rightmost edge of the C-shaped surrounding wall 320c, and faces the right-hand end 27 of the attachment wall 25.

The right-hand end 27 of the attachment wall 25 has an inner surface 27a that faces the surrounding wall 320c. The right-hand end 27 has a projection 27b projecting toward the right-hand curved portion 320c2 of the surrounding wall 320c. The projection 27b of the right-hand end 27 has a concavely curved inner surface 27c that faces the outer surface of the right-hand curved portion 320c2 with a slight clearance therebetween. The clearance constitutes a right upstream air-passage 18a. In other words, the right air-passage defining structure 324 includes the right-hand end 27 of the attachment wall 25, and the surrounding wall 320c of the tubular holder body 320.

In addition, referring to FIG. 14, the C-shaped surrounding wall 320c has the projection 324a that projects in the right direction from the radially rightmost edge of the C-shaped surrounding wall 320c.

The projection 27b of the right-hand end 27 has a bottom surface that faces an upper surface of the projection 324a with a slight clearance therebetween. The clearance constitutes a right midstream air-passage 18b. In other words, the right air-passage defining structure 324 includes the right-hand end 26 of the attachment wall 25, and the surrounding wall 320c of the tubular holder body 320.

The right upstream air-passage 18a extends downward along the outer surface of the right-hand curved portion 320c2, and the right midstream air-passage 18b communicates with the lower end of the right upstream air-passage 18a, and extends, across the extending direction of the right upstream air-passage 18a, in the right-hand direction from the lower end of the right upstream air-passage 18a.

Referring to FIG. 14, the inner surface 27a of the right-hand end 27 of the attachment wall 25 faces the right-hand surface of the projection 324a with a slight clearance therebetween in the vehicle width direction. The clearance constitutes a right downstream air-passage 18c. In other words, the right air-passage defining structure 324 includes the right-hand end 27 of the attachment wall 25, and the surrounding wall 320c of the tubular holder body 320.

The right downstream air-passage 18c communicates with the right-hand end of the right midstream air-passage 18b, and extends, perpendicular to the extending direction of the right midstream air-passage 18b, downward from the right-hand end of the right midstream air-passage 18b. In other words, the assembly of the air-passages 18b and 18c has a portion bent at a suitable angle, for example right angles, between the air-passages 18b and 18c.

The right-hand upstream air passage 18a forcibly guides air, such as warm air, which is entering through the opening 21 toward the inside of the housing 2, to be oriented downward along the outer surface of the right-hand curved portion 320c2 (see arrow 64 in FIG. 14). The upper surface of the projection 324a changes the orientation 64 of the air flowing through the right upstream air-passage 18a to the orientation (see arrow 65 in FIG. 14) bypassing the control circuit board 4 at the lower end of the right upstream air-passage 18a. This guides the air flowing through the right upstream air-passage 18a into the right midstream air-passage 18b. The right midstream air-passage 18b continuously guides the air to the orientation 65 so as not to be directed toward the control circuit board 4.

The inner surface 27a of the right-hand end 27 of the attachment wall 25 changes the orientation 65 of the air flowing through the right midstream air-passage 18b downward in the orientation 66. The right downstream air-passage 18c continuously guides the air downward.

Specifically, the right upstream air-passage 18a, the right midstream air-passage 18b, and the right downstream air-passage 18c constitute the fourth air-passage defined by the fourth air-passage defining structure 324, to which a reference numeral (18a, 18b, 18c) will be assigned. The fourth air-passage (18a, 18b, 18c) has two corners through each of which the orientation of air entering the fourth air-passage (18a, 18b, 18c) is changed.

In other words, the fourth air-passage (18a, 18b, 18c) has a substantially crank shape including two portions each bent at, for example, right angles. To put it another way, the fourth air-passage (18a, 18b, 18c) is stepped to have one step as an example of a labyrinth structure. Each of the two portions of the fourth air-passage (18a, 18b, 18c) is not limited to be bent at right angles, and can be bent at other desired angles.

From another perspective, the fourth air-passage defining structure 324 narrows a space between the lens holder 32 and the right-hand end 27 of the attachment wall 25 to the fourth air-passage (18a, 18b, 18c) comprised of the right upstream air-passage 18a, the right midstream air-passage 18b, and the right downstream air-passage 18c. That is, air, which tries to enter the inside of the housing 2 via the opening 21, flows from a wide space around the opening 21, i.e. the entrance of the housing 2, into the narrowed fourth air-passage (18a, 18b, 18c), and thereafter, flows into a wide space in the housing 2.

The fourth air-passage defining structure 324 causes air to (1) Flow through the right upstream passage 18a downward along the outer surface of the right-hand curved portion 320c2 (see arrow 64) to hit the upper surface of the projection 324a (2) Change in orientation to flow through the right midstream passage 18b in the right direction (see the arrow 65) so as not to be directed toward the control circuit board 4 to hit the inner surface 27a of the right-hand end 27 of the attachment wall 25

(3) Change in orientation to flow through the right downstream passage 18c downward (see the arrow 66) so as to flow in the housing 2.

Thus, even if the air flowing out of the right downstream passage 18c finally hits the control circuit board 4, the air has flowed through such a labyrinthine course of the fourth air-passage (18a, 18b, 18c), so that the air has travelled a long distance and has hit the upper surface of the projection 324a and the inner surface 27a of the right-hand end 27 of the attachment wall 25 two times. This results in the air, which has travelled a long distance, being sufficiently cooled before reaching the control circuit board 4.

The flow of air, which enters the inside of the housing 2 via the opening 21, passes through the narrowed passages 18a, 18b, and 18c, so that the velocity of the flow of air is reduced. This reduces the possibility that air containing with a water content reaches the control circuit board 4, thus reducing the possibility of the occurrence of condensation on the control circuit board 4.

Note that the size, i.e. the width, of the right upstream passage 18a in the vehicle width direction, the size, i.e. the width, of the right midstream passage 18b in the vertical direction, and the size, i.e. the width, of the right downstream passage 18c in the vehicle width direction can be adjusted. The narrower one or more the passages 18a to 18c are, the more the velocity of the flow of air is reduced. From another viewpoint, the fourth air-passage (18a, 18b, 18c) also serves as a route through which heat generated in the housing 2 is transferred to be exhausted from the opening 21 toward the outside of the housing 2.

For these reasons, the width of the right upstream passage 18a in the vehicle width direction, the width of the right midstream passage 18b in the vertical direction, and the width of the right downstream passage 18c in the vehicle width direction are preferably adjusted to satisfy both the capability of preventing condensation and the capability of transferring heat from the inside of the housing 2.

As described above, the first, second, third, and fourth air-passages (11, 12, 13), (14a, 14b, 14c), (16a, 16b, 16c), and (18a, 18b, 18c) result in reduction of the possibility of condensation occurring on each of the circuit boards (control circuit board 4 and camera board 33) without sealing the housing 2 and using drip-proof materials. Particularly, the imaging device 1 achieves the aforementioned advantage based on simple structural ideas applied to the assembly of the housing 2 and the camera holder 32.

The advantage of reducing the possibility of condensation occurring on each of the circuit boards 4 and 33 sufficiently reduces the possibility of water migration being produced in each of the circuit boards 4 and 33, thus sufficiently reducing the possibility of the occurrence of insulation failures in each of the circuit boards 3 and 33.

The first, second, third, and fourth air-passages (11, 12, 13), (14*a*, 14*b*, 14*c*), (16*a*, 16*b*, 16*c*), and (18*a*, 18*b*, 18*c*) make difficult that foreign materials, such as dusts, enter the inside of the housing 2 through a space between the housing 2 and the lens holder 32. This improves the quality reliability of each of the circuit boards 3 and 33.

The first, second, third, and fourth air-passages (11, 12, 13), (14*a*, 14*b*, 14*c*), (16*a*, 16*b*, 16*c*), and (18*a*, 18*b*, 18*c*) reduces (1) The possibility of light entering the inside of the housing 2 via the space between the housing 2 and the lens holder 32 and being reflected by elements and/or portions in and/or on the housing 2 to produce disturbance light (2) The possibility of the disturbance light being detected by the image sensor 33*a*.

This results in the imaging device 1 having an improved performance of recognizing images.

The first, second, third, and fourth air-passage defining structures 321 to 324 make hard that reflected images of elements installed in the housing 2 are seen from the outside of the housing 2. This results in the imaging device 1 having a better appearance when the imaging device 1 is viewed through the front windshield 102 of the vehicle V.

The opening 21 is comprised of the U-shaped concave recess 21*a* and the concave recess 22*c*, and the camera module 3 is arranged below the U-shaped concave recess 21*a*. This arrangement results in the attachment wall 25 being not located between the front windshield 102 and a part of the camera module 3 while the imaging device 1 is attached to the inner surface of the front windshield 102 (see FIG. 4). The part of the camera module 3 is, the front end of the lens barrel 31. This makes it possible to locate the camera module 3 to be so close to the inner surface of the front windshield 102 as to have the minimum distance between the inner surface of the front windshield 102 and the camera module 3 being smaller than the thickness of the attachment wall 25. This location results in the optical axes 310 of the lenses 311 to 314, which means a center axis of an entrance pupil of the camera module 3, being closer to the front windshield 102.

The U-shaped concave recess 21*a*, which allows the center axis of the entrance pupil of the camera module 3 to be as close to the front windshield 102 as possible, makes it possible to reduce the size of the hood 9 for enhancement of the appearance of the imaging device 1.

Making the space between both left-hand and right-hand upper ends of the C-shaped surrounding wall 320*c* of the tubular holder body 320 wider can result in the camera module 3, i.e. the center axis of the entrance pupil of the camera module 3, being closer to the inner surface of the front windshield 102.

The imaging device 1 is configured such that the U-shaped concave recess 21*a* of the attachment wall 25 is located to face the control circuit board 4 and the camera board 33. This configuration may cause warm air, such as air transferred from a heating apparatus installed in the vehicle V to easily enter the inside of the housing 2 via the opening 21. However, the first, second, third, and fourth air-passages (11, 12, 13), (14*a*, 14*b*, 14*c*), (16*a*, 16*b*, 16*c*), and (18*a*, 18*b*, 18*c*) efficiently reduce the possibility of condensation occurring on each of the control circuit board 4 and the camera board 33 due to the warm air.

Note that, as described above, the front, rear, right, and left directions described in the specification show the front, rear, right, and left directions of the vehicle V when the vehicle V is travelling in the front direction of the vehicle V (see FIGS. 2, 13, and 14). Specifically, the optical axes 310 of the lenses 311 to 314 of the lens assembly 3A are in agreement with the front-rear direction of the vehicle V. The orientation of the optical axes 310 of the lenses 311 to 314 toward an object to be captured by the lenses 310 to 314 is in agreement with the front direction of the vehicle V. The left-right direction is a direction perpendicular to both the optical axes 310 of the lenses 311 to 314 and the front-rear direction of the vehicle V. In other words, the left is a left side when an object located in front of the vehicle V is seen by the lenses 311 to 314, and the right is a right side when an object located in front of the vehicle V is seen by the lenses 311 to 314.

The present disclosure is not limited to the aforementioned embodiment. Elements of the imaging device 1 are not essential to imaging devices within the scope of the present disclosure except where the elements are clearly described as essential elements or the elements are obviously to be essential. Even if the number of elements, the values of elements, the amounts of elements, and the ranges of elements are disclosed in the specification, the present disclosure is not limited thereto except that they are clearly described as essential or they are principally estimated to be essential. Even if the shapes, locations, and positional relationships of elements are disclosed in the specification, the present disclosure is not limited thereto except that they are clearly described as essential or they are principally estimated to be essential.

Specifically, the following modifications can be included within the scope of the present disclosure, and the modifications can be selectively applied to the embodiment in combination or alone. That is, at least some of the modifications can be freely applied to the embodiment.

Each of the first, second, third, and fourth air-passages (11, 12, 13), (14*a*, 14*b*, 14*c*), (16*a*, 16*b*, 16*c*), and (18*a*, 18*b*, 18*c*) is configured to (1) Guide air so as not to be directed toward a corresponding one of the circuit boards 4 and 33

(2) Thereafter, guide the air to the orientation of a corresponding one of the circuit boards 4 and 33.

The present disclosure is not limited to the configuration.

Specifically, each of the first, second, third, and fourth air-passages (11, 12, 13), (14*a*, 14*b*, 14*c*), (16*a*, 16*b*, 16*c*), and (18*a*, 18*b*, 18*c*) according to the first modification can be configured not to finally guide the air to the orientation of a corresponding one of the circuit boards 4 and 33.

Figure 15:
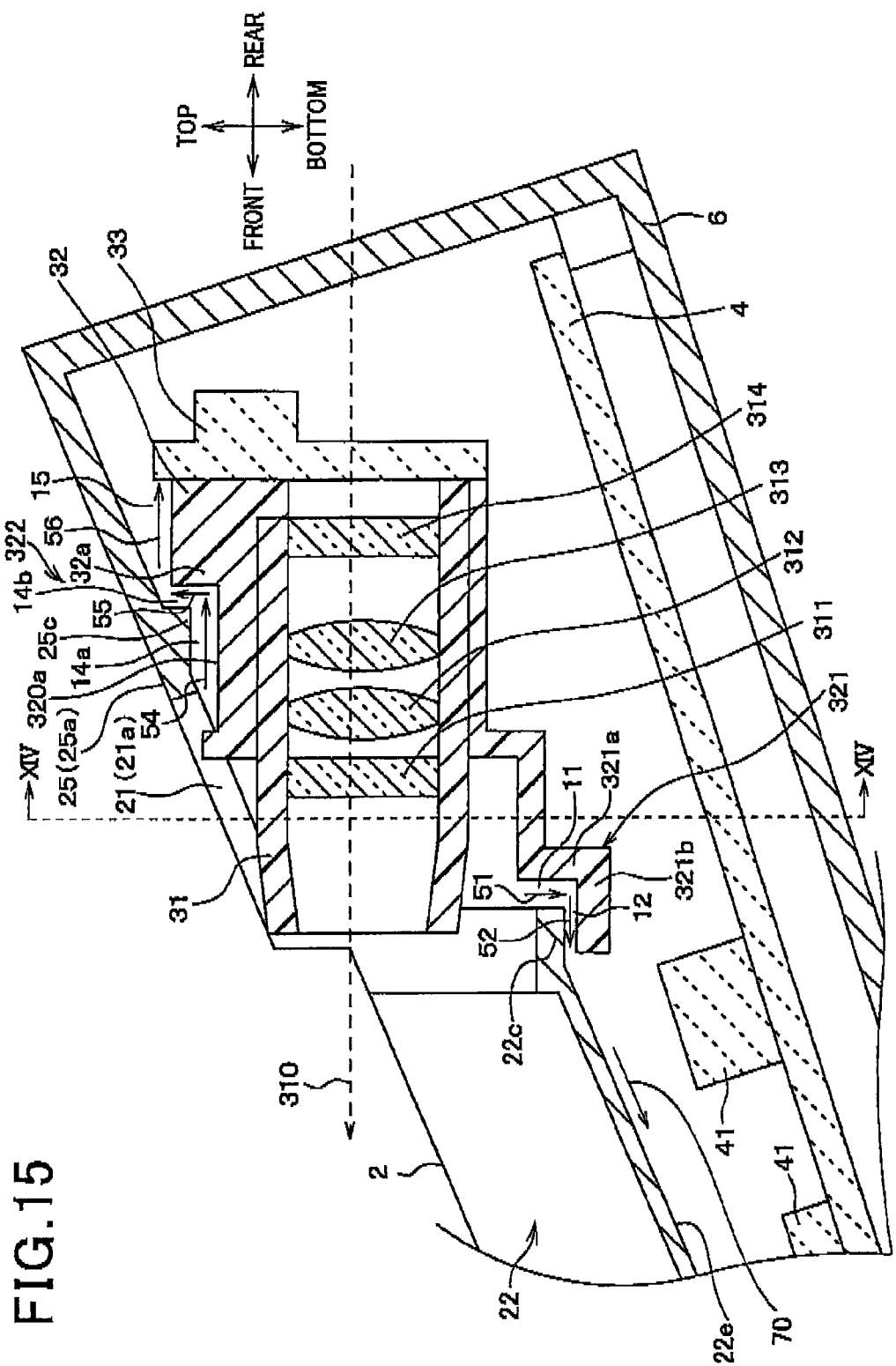
FIG. 15 is a cross sectional view of an imaging device according to an example of a first modification of the embodiment, which corresponds to the sectional view illustrated in FIG. 13.

An imaging device according to an example of the first modification is configured such that the partitioning wall 24 is eliminated from the configuration of the imaging device 1 (see FIG. 15). This configuration results in elimination of the lower downstream air-passage 13, so that air flowing through the lower midstream air-passage 12 continuously flows along an inner surface 22*e* of the trapezoidal recess 22 opposing the trapezoidal bottom surface 22*d* in a direction independently in the direction to the control circuit board 4 (see arrow 70 in FIG. 15). This configuration of the imaging device according to the first modification further reduces the possibility of the occurrence of condensation on each of the circuit boards 4 and 33.

Each of the top surface of the bottom wall 321*b*, the front surface of the base 32*a*, the upper surface of the projection 323*a*, and the upper surface of the projection 324*a* changes the orientation of air flowing toward a corresponding one of the circuit boards 4 and 33 to another orientation independent from the orientation toward a corresponding one of the circuit boards 4 and 33. In the embodiment, each of the top surface of the bottom wall 321*b*, the front surface of the base 32*a*, the upper surface of the projection 323*a*, and the upper surface of the projection 324*a* is formed at the lens holder 32. The present disclosure is however not limited to this configuration.

Specifically, each of the top surface of the bottom wall 321*b*, the front surface of the base 32*a*, the upper surface of the projection 323*a*, and the upper surface of the projection 324*a* can be formed at the housing 2. That is, each of the top surface of the bottom wall 321*b*, the front surface of the base 32*a*, the upper surface of the projection 323*a*, and the upper surface of the projection 324*a* according to the second modification can be formed at the assembly of the housing 2 and the camera holder 32.

Each of the first, second, third, and fourth air-passages (11, 12, 13), (14*a*, 14*b*, 14*c*), (16*a*, 16*b*, 16*c*), and (18*a*, 18*b*, 18*c*) is designed as a hollow channel, but the present disclosure is not limited thereto. Specifically, at least one of the first, second, third, and fourth air-passages (11, 12, 13), (14*a*, 14*b*, 14*c*), (16*a*, 16*b*, 16*c*), and (18*a*, 18*b*, 18*c*) according to the third modification can be configured such that a member, which lets air through, such as a moisture-permeable waterproof member, is contained therein.

As described above, no drop-proof materials are coated on the control circuit board 4 and the camera board 33, but an imaging device according to the fourth modification can be configured such that one or more drop-proof materials can be coated on the control circuit board 4 and/or the camera board 33. This may result in further reduction of the possibility of condensation occurring on the control circuit board 4 and/or the camera board 33.

The imaging device 1 according to the embodiment is used to be installed in vehicles, but the imaging device 1 according to the fifth modification can be used for another apparatus.

The vehicle control module 77 according to the embodiment, which includes, for example, the headlight control ECU 778*a* and the lane departure detection ECU 778*b*, is located at the outside of the camera system 100 and installed in the vehicle V, but the present disclosure is not limited thereto. Specifically, the vehicle control module 77 according to the sixth modification can be implemented in the control circuit board 4. In the sixth modification, the vehicle control module 77 including, for example, the headlight control ECU 778*a* and the lane departure detection ECU 778*b*, can be configured to send, to at least one of the actuators of target devices installed in the vehicle V, a control signal for controlling the corresponding actuator based on both the camera information sent from the image processing circuit 79 and the sensor signals sent from the respective sensors 761 to 763.

The vehicle control module 77 and the image processing circuit 79 according to the embodiment is configured to send, to at least one of the actuators, a control signal for controlling the corresponding actuator based on both the camera information sent from the image processing circuit 79 and the sensor signals sent from the respective sensors 761 to 763. The present disclosure is however not limited to the configuration.

Specifically, the vehicle control module 77 according to the seventh modification can be configured to send, to at least one of the actuators, a control signal for controlling the corresponding actuator based on either the camera information sent from the image processing circuit 79 or the sensor signals sent from the respective sensors 761 to 763.

The image processing circuit 79 is configured to perform, based on at least one of the camera information sent from the image processing circuit 79 and the sensor signals sent from the respective sensors 761 to 763, (1) The detection task 40*a* to determine whether there is at least one light source of a vehicle appearing in each of the captured images (2) The light-source recognition task 40*b* to determine whether the at least one light source determined by the detection task 40*a* is a light source, i.e. a tail lamp, of a preceding vehicle or a light source, i.e. a head lamp, of an oncoming vehicle (3) The lane-marker detection task 40*c* to detect the positions of lane markers painted on the road on which the vehicle V is running.

The present disclosure is however not limited to the configuration.

Specifically, the vehicle control module 77 according to the eighth modification can be configured to perform, based on at least one of the camera information sent from the image processing circuit 79 and the sensor signals sent from the respective sensors 761 to 763, a recognition task to detect at least one of (1) The lanes ahead of the vehicle V including a lane on which the vehicle V is currently travelling, which will be referred to as lane information (2) The shape of a road ahead of the travelling vehicle V, which will be referred to as road-shape information (3) The conditions of a road surface ahead of the travelling vehicle V, which will be referred to as road-surface information (4) One or more light sources ahead of the vehicle V, which will be referred to as light-source information (5) One or more preceding vehicles including vehicles travelling adjacent to the vehicle V, which will be referred to as preceding-vehicle information (6) One or more oncoming vehicles, which will be referred to as oncoming-vehicle information (7) One or more stopped vehicles around the vehicle V, which will be referred to as stopped-vehicle information (8) One or more preceding pedestrians around the vehicle V, which will be referred to as preceding-pedestrian information (9) One or more oncoming pedestrians around the vehicle V, which will be referred to as oncoming-pedestrian information

(10) One or more stopping persons around the vehicle V, which will be referred to as stopped-person information

(11) One or more motor cycles around the vehicle V, which will be referred to as motor-cycle information

(12) One or more bicycles around the vehicle V, which will be referred to as bicycle information

(13) One or more obstacles around the vehicle V, which will be referred to as obstacle information

(14) One or more roadside objects around the vehicle V, which will be referred to as roadside-object information

(15) One or more traffic signs around the vehicle V, which will be referred to as traffic-sign information

(16) One or more traffic signals around the vehicle V, which will be referred to as traffic-signal information

(17) One or more traffic markings around the vehicle V, which will be referred to as traffic-marking information

(18) One or more advertising signs around the vehicle V, which will be referred to as advertising-sign information

(19) A tunnel through which the vehicle V is going to go, which will be referred to as tunnel information

(20) One or more emergency parking bays, which will be referred to as emergency-bay information

(21) Something that blocks the view of the camera module 3, which will be referred to as camera-view blocking information

(22) Meteorological environments around the vehicle V, which will be referred to as meteorological-environment information

(23) Building structures around the vehicle V, which will be referred to as building structure information.

The lanes ahead of the vehicle V including a lane on which the vehicle V is currently travelling can be recognized based on the lane markers detected by the lane-marker detection task 40c.

The shape of a road represents the curvature or slope of the road, and the conditions of a road include the degree of reflection on the road surface particularly if it is raining or snowing.

The light sources include a tail lamp of a preceding vehicle and a head lamp of an oncoming vehicle, and can be recognized by the light-source recognition task 40b set forth above.

The preceding pedestrians are pedestrians walking, ahead of the vehicle V, in a direction identical to the travelling direction of the vehicle V, and the oncoming pedestrians are pedestrians walking, ahead of the vehicle V, in a direction opposite to the travelling direction of the vehicle V. The stopping persons are persons stopping around the vehicle V, and the obstacles include, for example, rocks and the like. The roadside objects include, for example, roadside curbs, roadside guardrails, roadside poles, roadside trees, roadside fences, roadside walls, roadside buildings, roadside parked vehicles, roadside parked bicycles, roadside electric poles, and so on. An emergency parking bay is a place provided at a shoulder of a road for getting out of the flow of traffic through the road. Something that obstructs the view of the camera module 3 includes smudges attached to a portion of the front windshield 102, which is located in front of the lenses 311 to 314, or to at least one of the lenses 311 to 314. Something that obstructs the view of the camera module 3 also includes sheets or the like adhered on a portion of the front windshield 102, which is located in front of the lenses 311 to 314. The meteorological environments around the vehicle V represent whether information around the vehicle V, such as rain, snow, fog, the degree of backlight, and the like.

The vehicle control module 77 receives the results of one or more image recognition tasks performed by the image processing circuit 79. The vehicle control module 77 is configured to perform, based on the results of the one or more image recognition tasks, at least one of vehicle control tasks including (1) A lane departure warning task described hereinbefore (2) A lane keeping task (3) A headlight control task described hereinbefore (4) A task for preventing broadside collisions (5) A task for preventing collisions at intersections (6) A task for preventing front collisions (7) A sign displaying task (8) A speed-limit displaying task (9) An overspeed warning task

(10) An automatic wiper task

(11) A task for assisting lane changes

(12) An around view displaying task

(13) Automatic parking task

(14) An adaptive cruise control task

(15) A blind-spot warning task

(16) A rear cross-traffic warning task

(17) A front cross-traffic warning task

(18) An inter-vehicle distance warning task

(19) A rear-end collision warning task

(20) An erroneous start preventing task.

The lane keeping task is designed to send, based on the lane information and the road-shape information, a control signal to the actuator of the steering device 771 to adjust the steering angle of the steering, thus keeping the vehicle V within the lane on which the vehicle V is travelling.

The headlight control task, i.e. high- and low-beam switching task and swiveling task, is performed by the headlight control ECU 778a set forth above based on the lane information, the road-shape information, the road-surface information, and the light-source information.

The task for preventing broadside collisions is designed to (1) Determine whether a probability that the vehicle V will collide with at least one moving object, such as a vehicle, a motor cycle, a bicycle, or the like, which is crossing at an intersection in front of the vehicle V, is higher than a predetermined threshold value (2) Send a control signal to a target actuator, such as the actuator of at least one of the steering device 771 and the brake 772, to control the target actuator when it is determined that the probability is higher than the threshold value, thus avoiding the collision .

The task for preventing collisions at intersections is designed to (1) Determine, when the vehicle V is turning at an intersection, whether a probability that the vehicle V will collide with at least one object, such as a vehicle, a motor cycle, a bicycle, a pedestrian, or the like, located around the vehicle V, is higher than a predetermined threshold value (2) Send a control signal to a target actuator, such as the actuator of at least one of the steering device 771 and the brake 772, to control the target actuator when it is determined that the probability is higher than the threshold value, thus avoiding the collision.

The task for preventing front collisions is designed to (1) Determine whether a probability that the vehicle V will collide with at least one object, such as a preceding vehicle, a motor cycle, a bicycle, a pedestrian, or the like, located ahead of the vehicle V is higher than a predetermined threshold value (2) Send a control signal to a target actuator, such as the actuator of at least one of the steering device 771 and the brake 772, to control the target actuator when it is determined that the probability is higher than the threshold value, thus avoiding the collision.

Note that each of the task for preventing broadside collisions, the task for preventing collisions at intersections, and the task for preventing front collisions includes a task for 1. Determining whether the vehicle V can pass through a tunnel or below an adverting sign when the tunnel or the advertising sign is detected ahead of the vehicle V 2. Send a control signal to a target actuator, such as the actuator of at least one of the buzzer 781 and the speaker 782, to control the target actuator when it is determined that the vehicle V cannot pass through the detected tunnel or below the detected adverting sign, thus avoiding a collision with the detected tunnel or the detected advertising sign.

Each of the task for preventing broadside collisions and the task for preventing collisions at intersections is performed based on, for example, the results of the one or more image recognition tasks associated with 1. The road-surface information
2. The preceding-vehicle and oncoming-vehicle information
3. The stopped-vehicle information
4. The preceding-pedestrian and oncoming-pedestrian information
5. The stopped-person information
6. The motor-cycle and bicycle information
7. The obstacle and roadside-object information
8 The advertising-sign information
9. The tunnel information.

The sign displaying task is designed to send, based on at least one of the traffic-sign information, the traffic-signal information, the traffic-marking information, the advertising-sign information, and so on, a control signal to the actuator of the display 784 so that the display 784 displays at least one of the traffic-sign information, the traffic-signal information, the traffic-marking information, the advertising-sign information, and so on.

The speed-limit displaying task is designed to send, based on the traffic-sign information, a control signal to the actuator of the display 784 so that the display 784 displays a speed limit if the speed limit is indicated by the traffic-sign information.

The overspeed warning task is designed to

1. Determine whether the speed of the vehicle V is exceeding the speed limit indicated by the traffic-sign information
2. Send a control signal to the actuator of at least one of the buzzer 781 and the speaker 782 when it is determined that the speed of the vehicle V is exceeding the speed limit indicated by the traffic-sign information.

The control signal controls the actuator of at least one of the buzzer 781 and the speaker 782, so that at least one of the buzzer 781 and the speaker 782 audibly outputs a warning to occupants of the vehicle V; the warning represents the overspeed of the vehicle V.

The automatic wiper task is designed to (1) Determine whether the driver's visibility is lower than a predetermined threshold value based on the road-surface information and the meteorological-environment information (2) Send a control signal to the actuator of at least one of the windshield wipers 777 so that at least one of the windshield wipers 777 is activated to clean a corresponding at least one of the front windshield 102 and rear windshield from rain, snow, or other moisture.

The task for assisting lane changes is designed to, for example, detect another vehicle travelling in a target lane adjacent to the lane on which the vehicle V is travelling based on the preceding-vehicle information. Then, the task for assisting lane changes is designed to send control signals to the actuators of the respective steering device 771, brake 772, automatic transmission 774, and directional indicator 776 to control the devices 771, 772, 774, and 776 for assisting the driver's operation for a lane change to the target lane according to the detected adjacent vehicle.

The around view displaying task is designed to send, to the actuator of the display 784, a control signal so that the display 784 displays an around-view image covering the surroundings of the vehicle V. The automatic parking task is designed to send control signals to the actuators of the respective steering device 771 and brake 772 for automatically parking the vehicle V to a desired position. The adaptive cruise control task is designed to send control signals to the actuators of the respective brake 772, motive power generator 773, and automatic transmission 774 for controlling the speed of the vehicle V to track a target preceding vehicle.

Each of the task for assisting lane changes, around view displaying task, automatic parking task, and adaptive cruise control task is performed based on, for example, the results of the one or more image recognition tasks associated with 1. The lane and road-shape information
2. The preceding-vehicle and oncoming-vehicle information
3. The stopped-vehicle information
4. The preceding-pedestrian and oncoming-pedestrian information
5. The stopped-person information
6. The motor-cycle and bicycle information
7. The obstacle and roadside-object information
8. The advertising-sign and traffic-signal information
9. The traffic-marking information.

The blind-spot warning task is designed to (1) Determine whether another vehicle is entering a blind spot at a rear corner of the travelling vehicle V (2) Send a control signal to the actuator of at least one of the buzzer 781 and the speaker 782 when it is determined that another vehicle is entering a blind spot at a rear corner of the travelling vehicle V.

The control signal controls the actuator of at least one of the buzzer 781 and the speaker 782, so that at least one of the buzzer 781 and the speaker 782 audibly outputs a warning to occupants of the vehicle V. The warning represents the entrance of another vehicle into a blind spot around the vehicle V.

The rear cross-traffic warning task is designed to (1) Determine whether another vehicle is entering a blind spot around the rear end of the vehicle V when the vehicle V is rolling backward (2) Send a control signal to the actuator of at least one of the buzzer 781 and the speaker 782 when it is determined that another vehicle is entering the blind spot around the rear end of the vehicle V.

The control signal controls the actuator of at least one of the buzzer 781 and the speaker 782, so that at least one of the buzzer 781 and the speaker 782 audibly outputs a warning to occupants of the vehicle V. The warning represents the entrance of another vehicle into the blind spot around the rear end of the vehicle V.

The front cross-traffic warning task is designed to (1) Determine whether another vehicle exists at a blind spot around the front end of the vehicle V when the vehicle V is located at a blind intersection (2) Send a control signal to the actuator of at least one of the buzzer 781 and the speaker 782 when it is determined that another vehicle exists at the blind spot around the front end of the vehicle V.

The control signal controls the actuator of at least one of the buzzer 781 and the speaker 782, so that at least one of the buzzer 781 and the speaker 782 audibly outputs a warning to occupants of the vehicle V. The warning represents that another vehicle exists at the blind spot around the front end of the vehicle V.

Each of the blind-spot warning task, rear cross-traffic warning task, and front cross-traffic warning task is performed based on, for example, the results of the one or more image recognition tasks associated with 1. The preceding-vehicle and oncoming-vehicle information
2. The stopped-vehicle information
3. The preceding-pedestrian and oncoming-pedestrian information
4. The stopped-person information
5. The motor-cycle and bicycle information
6. The obstacle and roadside-object information
7. The traffic-sign and traffic-signal information
8. The traffic-marking information.

The inter-vehicle distance warning task is designed to (1) Detect an inter-vehicle distance between the vehicle V and a target preceding vehicle (2) Determine whether the detected inter-vehicle distance is shorter than a predetermined threshold distance (3) Send a control signal to the actuator of at least one of the buzzer 781 and the speaker 782 when it is determined that the detected inter-vehicle distance is shorter than the threshold distance.

The control signal controls the actuator of at least one of the buzzer 781 and the speaker 782, so that at least one of the buzzer 781 and the speaker 782 audibly outputs a warning to occupants of the vehicle V. The warning represents that the inter-vehicle distance is shorter than the threshold distance.

The rear-end collision warning task is designed to (1) Determine whether a probability that the vehicle V will collide with the rear end of a preceding vehicle is equal to or higher than a predetermined threshold value (2) Send a control signal to the actuator of at least one of the buzzer 781 and the speaker 782 when it is determined that the probability that the vehicle V will collide with the rear end of a preceding vehicle is equal to or higher than the threshold value.

The control signal controls the actuator of at least one of the buzzer 781 and the speaker 782, so that at least one of the buzzer 781 and the speaker 782 audibly outputs a warning to occupants of the vehicle V. The warning represents the danger of collision of the vehicle V with the rear end of a preceding vehicle. Note that the inter-vehicle distance warning task and rear-end collision warning task are performed based on, for example, the results of the one or more image recognition tasks associated with the preceding-vehicle information.

The erroneous start preventing task is designed to determine whether an accelerator pedal of the vehicle V is operated by a driver of the vehicle V being parked although there is a building structure in front of the vehicle V. Note that whether the accelerator pedal of the vehicle V is operated by the driver of the vehicle V can be measured by an accelerator sensor included in the sensor module 76. The erroneous start preventing task is also designed to send a control signal to the actuator of the brake 772 when it is determined that the accelerator pedal of the vehicle V is operated by the driver of the vehicle V being parked although there is a building structure in front of the vehicle V. The control signal controls the actuator of the brake 772 to prevent start of the vehicle V due to such a driver's erroneous operation of the accelerator pedal. The erroneous start preventing task is performed based on, for example, the results of the one or more image recognition tasks associated with the building structure information.

Note that the vehicle control module 77 can be configured to stop one or more vehicle control tasks based on the actuators of target devices associated with motion of the vehicle V, such as the steering device 771 and the brake 772, when it is determined that something blocks the view of the camera module 3 based on the camera-view blocking information. The vehicle control module 77 can be configured to stop one or more vehicle control tasks when it is determined, based on the meteorological-environment information, that it is difficult to perform one or more image recognition tasks according to images picked up by the camera module 3 due to adverse weather conditions including, for example, torrential downpours.

As described above, the image processing circuit 79 and the vehicle control module 77 implemented on the control circuit board 4 communicate with the vehicle-side devices 75, 76, 77, and 78 via the common serial interactive communication bus 74 communicably coupled to the devices 75, 76, 77, and 78. As an exception to the configuration, the image processing circuit 79 and the vehicle control module 77 implemented on the control circuit board 4 communicate with the camera module 3 via the electrical connection harness 5.

The image processing circuit 79 according to the embodiment is implemented on the control circuit board 4, but the present disclosure is not limited thereto. Specifically, the image processing circuit 79 according to the ninth modification can be provided at the outside of the imaging device 1, and configured to capture, from the imaging device 1, images picked up by the imaging device 1 via the bus 74.

In the embodiment, the imaging device 1 is used, but the present disclosure is not limited thereto. Specifically, an optical device can be used in place of the imaging device 1; the optical device includes at least 1. A lens assembly (3A) including at least one lens (311 to 314) for receiving light and a holder (32) for holding the at least one lens (311 to 314)

2. A circuit board (4, 33) for performing at least one process based on the received light;

3. A housing (2) having an opening (21) and configured to house the lens assembly (3A) and the circuit board (4, 33) therein such that at least part of the circuit board (4, 33) faces the lens assembly (3A), and the lens assembly (3A) is exposed via the opening (21)

4. means, i.e. a mechanism (321, 322, 323, 324) defining a passage located around the lens assembly (3A) to communicate with the opening (21), the passage guiding air, entering the inside of the housing (2) via the opening (21), so as not to be directed toward the circuit board (4, 33).

While the illustrative embodiment and its modifications of the present disclosure have been described herein, the present disclosure is not limited to the embodiment and its modifications described herein. Specifically, the present disclosure includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An optical device comprising:
a lens assembly comprising at least one lens for receiving light and a holder for holding the at least one lens;
a circuit board for performing at least one process based on the received light;
a housing having an opening and configured to house the lens assembly and the circuit board therein such that at least part of the circuit board faces the lens assembly, and the lens assembly is exposed via the opening; and
means defining a passage located around the lens assembly to communicate with the opening, the passage guiding air, entering an inside of the housing via the opening, so as not to be directed toward the circuit board; wherein
the holder has a substantially tubular shape, and is configured to surround at least part of the lens assembly to hold the lens assembly, and
the defining means is configured to define the passage between the holder and an inner surface of the housing.

2. The optical device according to claim 1, wherein the passage is configured to guide the air so as not to be directed toward the circuit board, and thereafter, guide the air to the circuit board.

3. The optical device according to claim 1, wherein the passage comprises a bent portion so that a flow of the air guided by the passage is bent at the bent portion.

4. The optical device according to claim 1, wherein the passage comprises:
a first passage member extending in a first direction and communicating with the opening; and
a second passage member extending in a second direction and communicating with the first passage member such that the second direction of the second passage is bent with respect to the first direction of the first passage.

5. The optical device according to claim 4, wherein the passage further comprises:
a third passage member extending in a third direction and communicating with the second passage member such that the third direction of the third passage is bent with respect to the second direction of the second passage.

6. The optical device according to claim 5, wherein:
the first passage member is configured to guide the air entering the first passage member to the circuit board,
the second passage member is configured to guide the air entering the second passage member so as not to be directed toward the circuit board, and
the third passage member is configured to guide the air entering the third passage member to the circuit board.

7. The optical device according to claim 1, wherein the opening of the housing is located to face the circuit board.

8. The optical device according to claim 1, wherein the defining means is configured to define the passage on at least one of an outer surface of the holder and the inner surface of the housing.

9. The optical device according to claim 1, wherein the circuit board comprises at least one of:
a control circuit board on which an image processing circuit for performing, as the at least one process, image processing of an image obtained based on the received light; and
a sensor board on which an imaging sensor for obtaining an image based on the received light is implemented.

10. An optical system for a vehicle, the optical system comprising:
an optical device comprising:
a lens assembly comprising at least one lens for receiving light and a holder for holding the at least one lens;
a circuit board for performing at least one process based on the received light;
a housing having an opening and configured to house the lens assembly and the circuit board therein such that at least part of the circuit board faces the lens assembly, and the lens assembly is exposed via the opening; and
means defining a passage located around the lens assembly to communicate with the opening, the passage guiding air, entering an inside of the housing via the opening, so as not to be directed toward the circuit board; wherein
the housing has a concave recess communicating with the opening thereof, the optical device being housed in the housing with the lens assembly being exposed via a set of the concave recess and the opening such that a field of view of the lens assembly is ensured via the set of the concave recess and the opening; the optical system further comprising:
a cover having an opening wall and covering the optical device;
a bracket attached to an inner surface of a windshield of the vehicle and to the cover, the bracket covering the opening wall of the cover such that the field of view of the lens assembly is ensured via the set of the concave recess and the opening; and
a hood at least partly fitted in the concave recess with the field of view of the lens assembly being unblocked.

11. An imaging device to be installed in a vehicle, the imaging device comprising:
a lens assembly comprising at least one lens for receiving light and a holder for holding the at least one lens;
an imaging sensor for successively picking up images based on the received light;
a circuit board;
an image processing circuit implemented in the circuit board and configured to capture the successively picked-up images, and perform image processing of each of the picked-up images,
the image processing circuit comprising:
3.3V signal lines; and
external terminals with 1.27 mm or lower pitches
the image processing circuit being configured to:
receive, via a serial interactive communication bus installed in the vehicle, a signal output from at least one sensor installed in the vehicle, the signal being indicative a travelling condition of the vehicle, and
output, based on at least one of a result of the image processing of the image processing circuit and the signal output from the at least one sensor, a control signal to the vehicle via the serial interactive communication bus, the control signal controlling at least one actuator installed in the vehicle;
a housing having an opening and configured to house the lens assembly, the circuit board, and the imaging sensor therein such that at least part of the circuit board faces the lens assembly, and the lens assembly is exposed via the opening; and
means defining a passage located around the lens assembly to communicate with the opening, the passage guiding air, entering an inside of the housing via the opening, so as not to be directed toward the circuit board.

* * * * *